US007398716B2

(12) United States Patent
Quigley

(10) Patent No.: US 7,398,716 B2
(45) Date of Patent: Jul. 15, 2008

(54) METHOD AND APPARATUS FOR PROCESSING A TUBE

(76) Inventor: John Quigley, 20 Lafayette St., Dracut, MA (US) 01826

( * ) Notice: Subject to any disclaimer, the term of this patent is extended or adjusted under 35 U.S.C. 154(b) by 410 days.

(21) Appl. No.: 10/780,456

(22) Filed: Feb. 17, 2004

(65) Prior Publication Data

US 2004/0163512 A1 Aug. 26, 2004

Related U.S. Application Data

(60) Provisional application No. 60/448,737, filed on Feb. 20, 2003.

(51) Int. Cl.
*B23D 21/04* (2006.01)

(52) U.S. Cl. ................................ 82/47; 82/101; 82/102

(58) Field of Classification Search ..................... 82/47, 82/53, 101, 102, 98; *B23D 21/04*
See application file for complete search history.

(56) References Cited

U.S. PATENT DOCUMENTS

| | | | | | |
|---|---|---|---|---|---|
| 460,317 | A | * | 9/1891 | Whitney | 82/89 |
| 1,967,374 | A | * | 7/1934 | Scott | 82/89 |
| 2,020,113 | A | * | 11/1935 | Ferguson | 82/102 |
| 3,618,787 | A | * | 11/1971 | Nemoto et al. | 414/18 |
| 3,902,387 | A | | 9/1975 | Reynolds | |
| 3,933,090 | A | | 1/1976 | Reynolds | |
| 3,949,632 | A | | 4/1976 | Kapaan | |
| 4,108,034 | A | | 8/1978 | Thomas | |
| 4,205,569 | A | * | 6/1980 | Horn et al. | 83/82 |
| 4,671,150 | A | * | 6/1987 | Harris | 83/49 |
| 5,016,507 | A | | 5/1991 | Riera et al. | |
| 5,214,988 | A | | 6/1993 | Quigley | |
| 5,335,570 | A | * | 8/1994 | Ro | 82/48 |
| 5,894,771 | A | * | 4/1999 | Braun et al. | 82/47 |
| 6,045,441 | A | * | 4/2000 | Christensen et al. | 452/50 |

FOREIGN PATENT DOCUMENTS

| | | | | |
|---|---|---|---|---|
| JP | 61121801 | A | * | 6/1986 |
| JP | 06182601 | A | * | 7/1994 |

* cited by examiner

*Primary Examiner*—Monica Carter
*Assistant Examiner*—Sara Addisu
(74) *Attorney, Agent, or Firm*—Tarolli, Sundheim, Covell & Tummino LLP

(57) ABSTRACT

When a tube is to be cut into a plurality of sections, a tube feed assembly is operated to rotate the tube and to move the tube along its longitudinal central axis into a work station. The tube and a mandrel move into a telescopic relationship at the work station. The tube feed assembly presses an end of the tube against a stop surface on a stripper at the work station. A plurality of knives are moved into engagement with the tube to cut the tube. Relative movement between the stripper and mandrel separates the sections of the tube from the mandrel. A scrap end section of the tube is directed to a scrap receiving location. Other sections of the tube are directed to a product receiving location.

39 Claims, 12 Drawing Sheets

METHOD AND APPARATUS FOR PROCESSING A TUBE

RELATED APPLICATION

This application hereby claims the benefit of provisional Patent Application Ser. No. 60/448,737, filed Feb. 20, 2003 (Confirmation No. 8268) by John C. Quigley and entitled Linear Feed and Waste Control Apparatus for Core Cutting System. The disclosure in the aforementioned provisional Application Ser. No. 60/448,737 is hereby incorporated herein in its entirety by this reference thereto.

BACKGROUND OF THE INVENTION

The present invention relates to a new and improved method and apparatus for use in processing a tube. More specifically, the invention relates to the cutting of a tube into a plurality of sections.

A known apparatus for cutting a paper tube into a plurality of sections includes a feed ramp along which tubes move into alignment with a mandrel. Once a tube has moved into alignment with the mandrel, the mandrel is extended into a telescopic relationship with the tube. A mandrel drive assembly is operated to rotate the mandrel and the tube. While the mandrel and tube are rotating, a plurality of annular rotating knives are moved into engagement with the tube to cut the tube into a plurality of sections.

Once the tube has been cut into a plurality of sections with this known apparatus, the annular knives are moved out of engagement with the tube and the mandrel is retracted. Retracting of the mandrel results in the sections of the tube dropping downward to a receiving location. An apparatus having this construction and mode of operation is disclosed in U.S. Pat. No. 5,214,988.

SUMMARY OF THE INVENTION

The present invention relates to a new and improved method and apparatus for processing tubes. When a tube is to be processed, a first portion of the tube is moved into a work station. The first portion of the tube is cut into a plurality of sections at the work station.

One of the sections into which the first portion of the tube is cut may be a scrap section at one end of the tube. The scrap section may advantageously be moved to a scrap receiving location. Sections of the tube other than the scrap section may be moved to a product receiving location which is separate from the scrap receiving location.

After the first portion of the tube has been cut into a plurality of sections and the sections moved to receiving locations, a second portion of the tube is moved into the work station. The second portion of the tube is then cut into a plurality of sections. The plurality of sections of the second portion of the tube may be moved to the product receiving location.

When a tube is moved into the work station, the tube may be moved along its longitudinal central axis. As the tube is moved along its longitudinal central axis, the tube may be rotated about is longitudinal central axis. During movement of the tube along its longitudinal central axis, the tube may be aligned with and move into a telescopic relationship with a mandrel.

When the first portion of the tube moves into the work station, an end of the first portion of the tube may be pressed against a stop surface. After the first portion of the tube has been cut into a plurality of sections, a second portion of the tube may be moved along its longitudinal central axis in a direction away from the first portion of the tube. Cut sections of the first portion of the tube may then be disengaged from the mandrel. As the second portion of the tube is subsequently moved along the longitudinal central axis of the tube, an end of the second portion of the tube may move into engagement with the stop surface.

The present invention includes a plurality of different features which will be described in combination with each other. However, it is contemplated that each of the features may be utilized separately or may be combined in a different manner with one or more of the other features of the invention. It is also contemplated that one or more of the features of the invention may be utilized separately or in combination with features from the prior art.

BRIEF DESCRIPTION OF THE DRAWINGS

The foregoing and other features of the invention will become more apparent upon consideration of the following description taken in connection with the accompanying drawings wherein.

DESCRIPTION OF ONE SPECIFIC PREFERRED EMBODIMENT OF THE INVENTION

General Description

Figure 1:
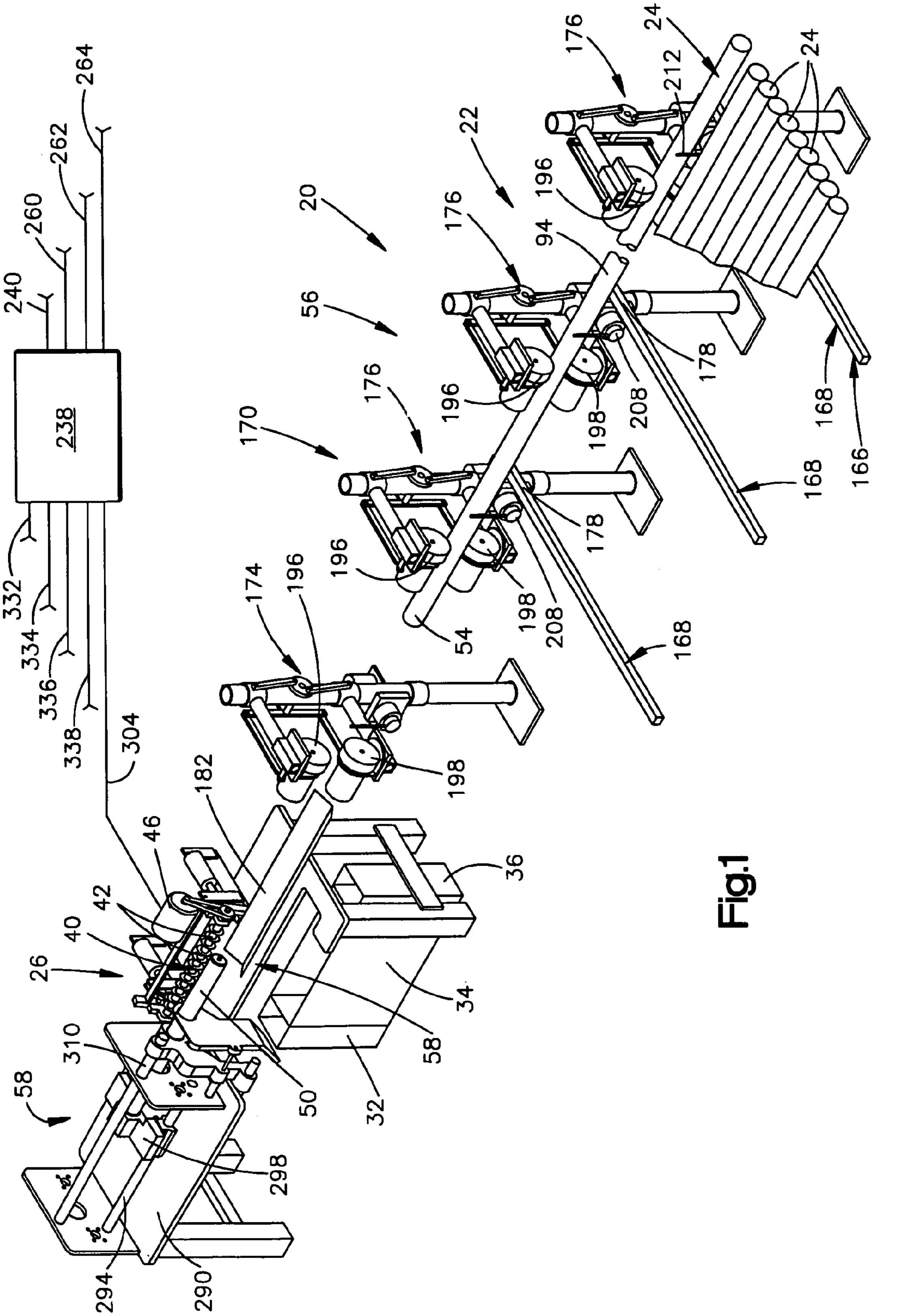
FIG. 1 is a simplified schematic illustration of an apparatus which is constructed and operated in accordance with the present invention to process tubes.

A tube processing apparatus 20 is illustrated in FIG. 1. The tube processing apparatus 20 includes a tube feed assembly 22 which is operable to sequentially feed hollow cylindrical tubes 24 to a tube cutter assembly 26. The tubes 24 may be formed of paper, polymeric material, or any other desired material. The tube cutter assembly 26 cuts a portion of the tube 24 into a plurality of cylindrical sections. These sections are then moved to one or more receiving locations 32, 34, and 36.

In accordance with one of the features of the invention, the receiving locations 32, 34, and 36 include scrap receiving locations 32 and 36 which receive scrap or defective sections of the tube 24. A product receiving location 34 receives sections of the tube which are not defective. By separating the scrap sections of the tube 24 from the product sections which are correctly formed, mixing of defective scrap sections with properly formed product sections is avoided.

Tape, ribbon, paper, or other materials may subsequently be wound around the product sections. Alternatively, the product sections of the tube may be used as spacers or insulating layers. It is contemplated that the product sections of the tube 24 will be used for many different purposes.

It is contemplated that the tubes 24 may have any one of many different lengths. However, as an illustrative example, the tubes 24 may be formed with a length of twenty feet. The hollow cylindrical tubes 24 may be cut into cylindrical sections having a relative short axial length, for example, one inch. Of course, a tube may be cut into cylindrical sections having a greater or lesser length if desired. It should be understood that the tubes 24 may be cut to form sections having any desired length (axial extent).

The tube cutter assembly 26 includes a linear array 40 (FIGS. 1 and 2) of annular knives 42. A knife drive motor 46 (FIG. 1) is connected with a spindle or arbor on which the annular knives 42 are mounted. The knife drive motor 46 is operable to rotate the arbor and annular knives 42 about a longitudinal central axis which extends through the center of each of the rotatable knives. The linear array 40 of rotatable annular knives 42 may have the same construction as is disclosed in U.S. Pat. No. 5,214,988. Although a plurality knives 42 are utilized in the embodiment of the invention illustrated in FIGS. 1 and 2, a single knife may be utilized if desired.

The annular knives 42 are spaced apart along the central axis of the linear array 40 by a distance which corresponds to the desired length (axial extent) of the cylindrical sections to be cut from a tube 24. For example, if the tube 24 is to be cut into cylindrical sections having an axial length of one inch, the knives 42 would be spaced apart by a distance of one inch along the longitudinal central axis of the linear array 40. Of course, the distance between the knives 42 may be adjusted to enable the tube 24 to be cut into cylindrical sections of any desired axial extent. It should be understood that a greater or lesser number of knives 42 may be provided to cut the tube 24 into a greater or lesser number of cylindrical sections.

Figure 2:
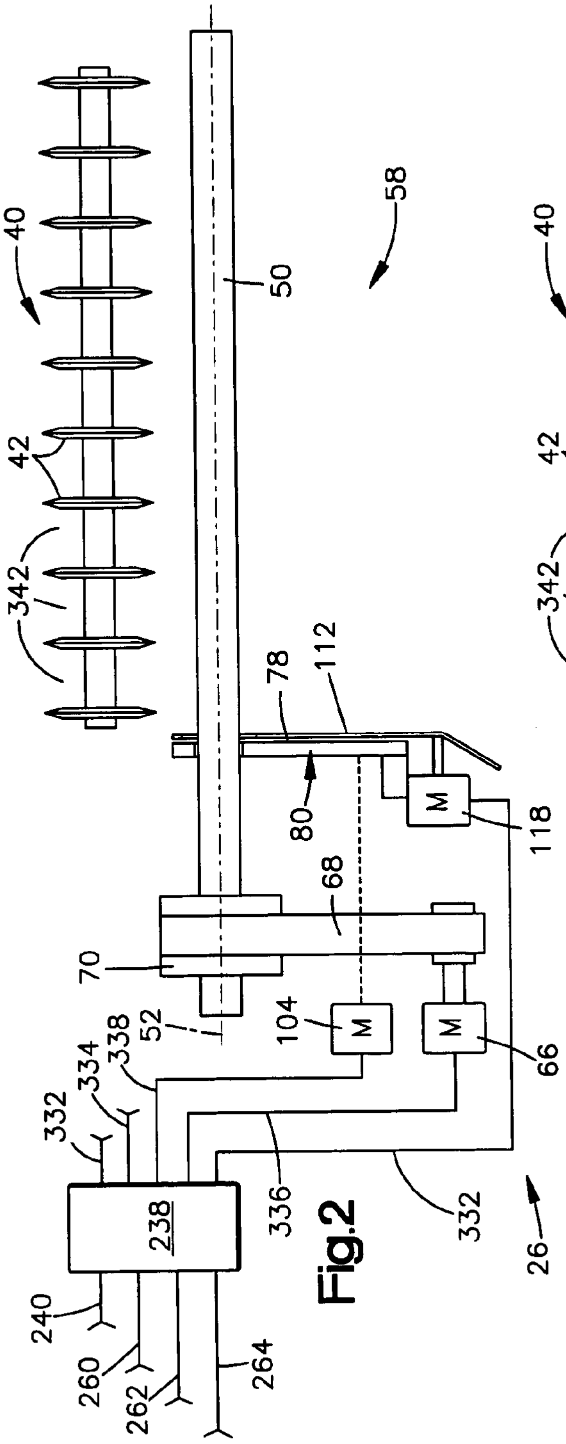
FIG. 2 is a schematic illustration depicting the relationship between a mandrel and an array of knives in the apparatus of FIG. 1.

During cutting of a portion of a tube 24 into a plurality of sections, the tube is supported by a cylindrical mandrel 50 (FIGS. 1 and 2). The cylindrical mandrel 50 is telescopically received in a portion of the tube 24 disposed in the tube cutter assembly 26. The mandrel 50 supports the tube 24 during cutting of the tube by the knives 42.

The mandrel 50 has a longitudinal central axis 52 (FIG. 2) which extends parallel to a central axis of the linear array 40 of knives 42. During cutting of the tube 24 (FIGS. 3 and 4) by the knives 42, the knives are rotated by the knife motor 46 and moved toward the)mandrel 50. The central axis 52 of the mandrel 50 is coincident with the central axis of the tube 24. The entire tube 24 is rotated with the mandrel 50 about the coincident central axes of the mandrel and tube as the tube is cut by the knives 42.

Operation

When a tube 24 is to be cut into sections, a leading end portion 54 (FIG. 1) of the tube is moved from a tube supply station 56 to a work station 58 (FIGS. 1-3) in the tube cutter assembly 26. The leading end portion 54 of the tube 24 is moved from the tube supply station 56 (FIG. 1) to the work station 58 by the tube feed assembly 22. In accordance with another one of the features of the invention, as the leading end portion 54 of the tube 24 moves from the tube supply station toward the work station 58, a longitudinal central axis of the cylindrical tube 24 is aligned with the longitudinal central axis 52 (FIGS. 2 and 3) of the cylindrical mandrel 50.

As the leading end portion 54 of the tube 24 moves into the work station 58 under the influence of force applied to the tube 24 by the tube feed assembly 22 (FIG. 1), the central axis 52 (FIG. 2) of the mandrel 50 is coincident with a longitudinal central axis of the hollow cylindrical tube 24. As the tube 24 continues to move into the work station 58, the leading end portion 54 of the tube slides over the extended mandrel 50 and into a telescopic relationship with the mandrel in the manner illustrated schematically in FIG. 3. As the tube 24 continues to be moved into the work station 58, the telescopic relationship between the mandrel 50 and the tube 24 increases.

In accordance with another one of the features of the present invention, both the extended mandrel 50 and the tube 24 are rotating about coincident central axes when they are moved into a telescopic relationship. Thus, the tube feed assembly 22 (FIG. 1) simultaneously rotates the tube 24 and moves the tube axially into the work station 58 into a telescopic relationship with the mandrel 50. At the same time, a mandrel drive motor 66 (FIGS. 2 and 3) is operated to rotate the mandrel 50 under the influence of force transmitted through a drive belt 68 to a drive pulley 70. The tube feed assembly 22 (FIG. 1) rotates the tube 24 in the same direction and at the same speed as in which the mandrel 50 is rotated by the motor 66.

The mandrel 50 is rotated with the pulley 70 and is axially movable relative to the pulley. The manner in which the mandrel 50 and pulley 70 are interconnected may be the same as is disclosed in the aforementioned U.S. Pat. No. 5,214,988. The rotating mandrel 50 may be moved toward the right (as viewed in FIGS. 1-3) simultaneously with leftward movement of the leading end portion 54 of the rotating tube 24 into the work station 58. Alternatively, the rotating mandrel 50 may be fully extended before the rotating tube 24 is moved into the work station 58.

Figure 3:
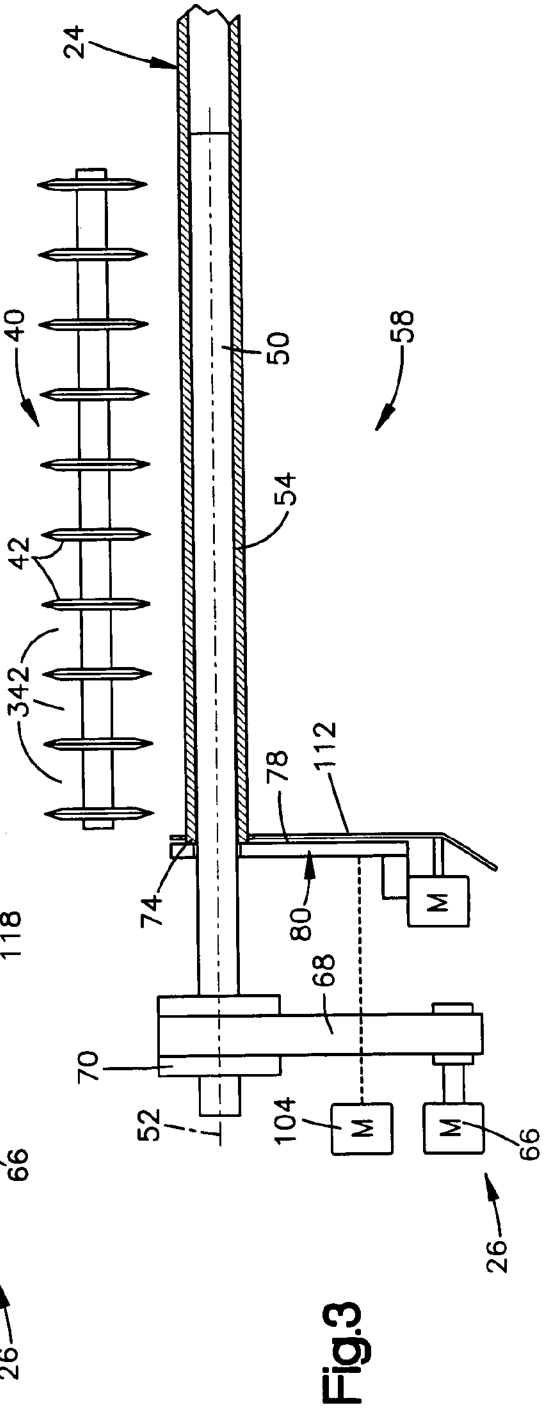
FIG. 3 is a schematic illustration, generally similar to FIG. 2, depicting the manner in which a portion of a tube and mandrel are moved into a telescopic relationship.

When the leading end portion 54 of the tube 24 is moved into the work station 58, in the manner illustrated schematically in FIG. 3, a circular leading end 74 of the rotating tube 24 moves axially into engagement with a stationary stop surface 78 on a stripper plate 80. Engagement of the leading end 74 of the tube 24 with the stop surface 78 positions the leading end portion 54 of the tube 24 relative to the knives 42.

It should be understood that the mandrel 50 does not have to be extended as the tube 24 moves into the work station 58. The mandrel 50 may be moved from its retracted condition to its extended condition after the tube 24 has moved into the work station 58. Alternatively, the mandrel 50 may be moved from its retracted condition to its extended condition as the tube 24 moves into the work station 58.

It is believed that it may be desired to have the mandrel 50 rotating about its central axis as the tube 24 and mandrel move into a telescopic relationship. However, if desired, the mandrel 50 may not be rotating about its central axis as the tube 24 and mandrel move into a telescopic relationship. Alternatively, the mandrel 50 may not be rotating during a portion of the movement of the tube 24 and mandrel into a telescopic relationship and may be rotating during another portion of the movement of the tube and mandrel into a telescopic relationship.

In accordance with another of the features of the present invention, the tube feed assembly 22 (FIG. 1) reduces the speed of axial movement of the rotating tube 24 shortly before the leading end 74 of (FIG. 3) the tube 24 engages the stop surface 78 on the stripper plate 80. This minimizes the possibility of damage to the tube by engagement with the stripper plate 80. However, the tube feed assembly 22 is effective to maintain the direction and speed of rotation of the tube 24 about its longitudinal central axis constant and in the same direction and speed of rotation as the mandrel 50. Therefore, the only relative movement between the mandrel 50 and the tube 24 is axial movement as the tube slides onto the mandrel.

It may be desired to have the tube 24 and mandrel 50 rotating at the same speed as they are moved into a telescopic relationship, in the manner previously mentioned. However, the tube 24 and the mandrel 50 may be rotating at different speeds as they are moved into a telescopic relationship. The speed of rotation of the tube 24 and/or mandrel 50 may be varied as they are moved into a telescopic relationship.

In accordance with another one of the features of the present invention, when the leading end 74 (FIG. 3) of the tube 24 has engaged the stop surface 78 on the stripper plate 80, the tube feed assembly 22 continues to apply both rotational force and axial force to the tube 24. This force rotates the tube 24 and presses the leading end 74 of the tube lightly against the stop surface 78. This maintains the leading end portion 54 of the tube 24 in a desired relationship with the knives 42 and mandrel 50.

Figure 4:
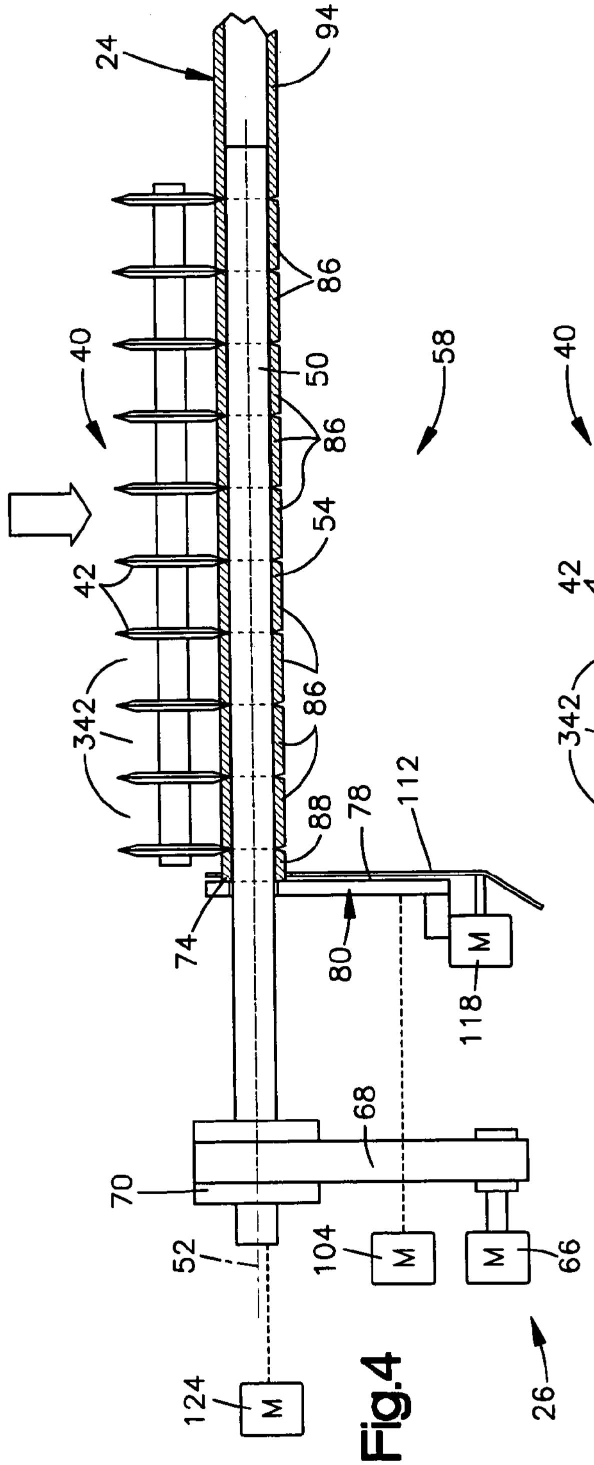
FIG. 4 is a schematic illustration, generally similar to FIGS. 2 and 3, depicting the manner in which the knives are moved into engagement with the tube to cut the tube into a plurality of sections.

While the tube 24 is being rotated at the same speed and in the same direction as the mandrel 50, the linear array 40 of knives 42 is moved into engagement with the tube 24 in the manner illustrated schematically in FIG. 4. Thus, the linear array 40 of knives 42 is moved toward the central axis 52 of the mandrel. The annular knives 42 are rotated about an axis extending parallel to the axis 52 of the mandrel by the knife drive motor 46 (FIG. 1).

The knives 42 cut the leading end portion 54 of the tube 24 at a plurality of spaced apart locations along the length of the leading end portion of the tube. This results in the formation of a plurality of hollow cylindrical product sections 86 (FIG. 4) having the same length, that is, axial extent. The length or axial extent of the identical product sections 86 corresponds to the distance between the annular knives 42. Of course, if it is desired to have product sections 86 with an axial extent which is either greater or smaller than the axial extent of the product sections illustrated in FIG. 4, the distance between the annular knives 42 would be adjusted.

In accordance with another one of the features of the present invention, a scrap section 88 (FIG. 4) is formed between the inner most knife 42 in the array 40 of knives and the stripper plate 80. The hollow cylindrical scrap section 88 has a length (axial extent) which is equal to the distance between the stop surface 78 and the first knife 42 in the array 40 of knives. The leading end 74 of the rotating tube 24 is disposed on the scrap section 88 and is pressed against the stop surface 78 during cutting of the tube 24.

The distance between the stop surface 78 on the stripper plate 80 and the first knife 42 is relatively small. This results in the scrap section 88 having a length which is less than the length of the product sections 86. For example, the scrap section 88 may have an axial length which is less than one half the axial length of the product sections 86. By minimizing the length of the scrap section 88, the amount of the tube 24 which is utilized to form product sections 86 tends to be maximized.

In accordance with another one of the features of the present invention, a main portion 94 (FIG. 5) of the tube 24 is axially moved away from the leading end portion 54 of the tube, in the direction of the arrow 96, after the leading end portion 54 of the tube 24 has been cut to form the product sections 86. At this time, the knives 42 engage the product sections 86 to hold the rotating product sections against axial movement relative to the mandrel 50. This interrupts transmission of force from the main portion 94 of the tube 24 to the product sections 86 and/or knives 42. However, if desired, the knives 42 may be moved away from the product sections 86 before the main portion 94 of the tube 24 is moved in the direction of the arrow 96.

As the main portion 94 of the rotating tube 24 is axially moved away from the rotating leading end portion 54 of the tube, a space or gap 100 is established between the main portion of the tube and the leading end portion of the tube. The annular gap 100 may have a length, along the center line 52 of the mandrel 50, of between one and two inches. Of course, the gap 100 could be formed with any desired axial extent. This eliminates the axial force which previously pressed the leading end portion 54 of the tube 24 against the stop surface 78 on the stripper plate 80.

The array of 40 of annular knives 42 is moved away from the mandrel 50 either before or after the gap 100 is formed. The array 40 of knives 42 is moved away from the mandrel 50 along the path which extends perpendicular to the central axis 52 of the mandrel and the axis about which the knives 42 are rotated by the knife drive motor 46. At this time, the rotating product sections 86 and scrap section 88 are supported by the rotating mandrel 50.

Figure 5:
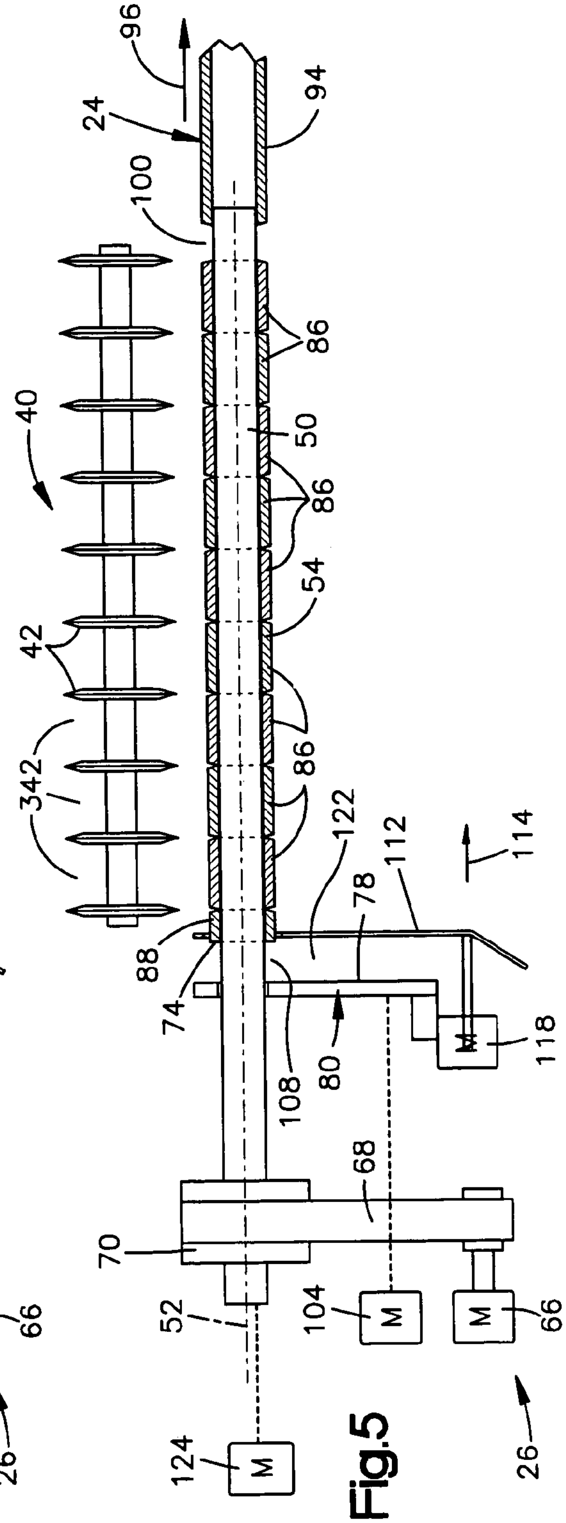
FIG. 5 is a schematic illustration, generally similar to FIGS. 2-4, depicting the manner in which the knives are moved away from the cut tube, the manner in which a baffle is moved relative to a stripper plate, and the manner in which a remaining portion of the tube is moved away from the cut sections of the tube.

After the linear array 40 of knives 42 has been moved away from the mandrel 50 to the position illustrated schematically in FIG. 5, the stripper plate 80 is retracted from the initial or extended position of FIG. 4 to a home or retracted position, illustrated in FIG. 5, by operation of a stripper plate drive motor 104. When the stripper plate 80 is in the home position illustrated in FIG. 5, the stop surface 78 on the stripper plate 80 is spaced from the closest knife 42 by a distance which is equal to the spacing between adjacent knives. Thus, the distance between the plane of the stop surface 78 on the stripper plate 80 and the plane of a cutting edge on the closest knife 42 is equal to the distance, as measured along the central axis 52 of the mandrel 50, between planes containing cutting edges on two adjacent knives 42.

The scrap section 88 usually has a length (axial extent) which is less than the length of the product sections 86. However, with certain product sections 86, the scrap section 88 may have a length which is greater than the length of a product section. For example, if the product section has a length of one quarter of an inch, the scrap section may have a length of one half of an inch.

As the stripper plate 80 is moved from the initial position of FIG. 4 to the home position of FIG. 5, the scrap section 88 and product sections 86 do not move axially along the mandrel 50. Therefore, a gap 108 is established between the leading end surface 74 on the scrap section 88 and the stop surface 78 on the stripper plate 80.

Contemporaneously with movement of the stripper plate 80 from the initial position of FIGS. 3 and 4 to the home position of FIG. 5, a baffle 112 is moved away from the stripper plate 80 in the direction of the arrow 114 (FIG. 5). The baffle 112 is moved to the extended position of FIG. 5 by operation of a baffle motor 118. The baffle motor 118 is supported on the stripper plate 80. The baffle motor 118 is moved with the stripper plate 80 as the stripper plate moves from the extended position of FIG. 4 to the home position of FIG. 5.

In accordance with another feature of the invention, the baffle motor 118 is operated to move the baffle 112 away from the retracted stripper plate 80. This results in the formation of a space 122 between the baffle 112 and the stripper plate 80. The space 122 has a length, as measured along the central axis 52 of the mandrel 50, which is slightly greater than the length (axial extent) of the scrap section 88.

Figure 6:
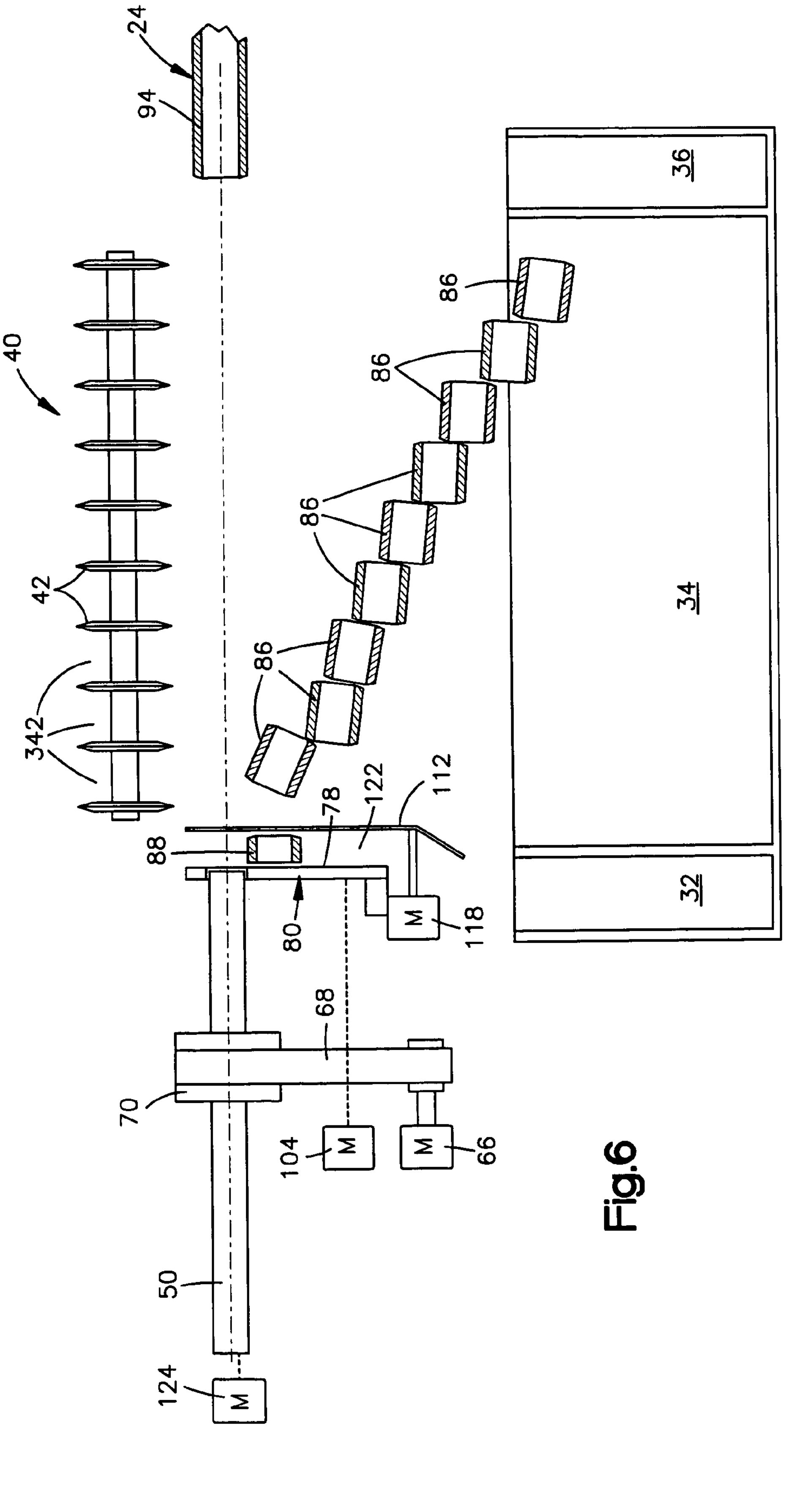
FIG. 6 is a schematic illustration, generally similar to FIGS. 2-5, depicting the manner in which cut sections of a portion of a tube move to a product receiving location and an end section of a cut portion of a tube moves to a scrap receiving location.

Once the stripper plate 80 has been moved to the home position (FIG. 5) and the baffle 112 has been moved to the extended position (FIG. 5), the mandrel 50 is retracted by operation of a mandrel drive motor 124. As the mandrel 50 is retracted, the scrap section 88 and product sections 86 do not move relative to the mandrel until the gap 108 is eliminated and the scrap section engages the stop surface 78. Continued retraction of the mandrel 50 withdraws the mandrel from the product sections 86, when this happens, the product sections 86 are no longer supported by the mandrel and fall downward, under the influence of gravity, into the product receiving location 34 (FIGS. 1 and 6). A second baffle 126 (FIG. 6) is provided to keep the product section 86 adjacent to the main portion 94 of the tube 24 from falling into the scrap receiving location 36.

As the mandrel 50 continues to be retraced by the drive motor 124, the mandrel moves out of engagement with the scrap section 88. This releases the scrap section 88 for downward movement under the influence of gravity. The baffle 112 is effective to direct the scrap section 88 into the scrap receiving location 32 and to block movement of the scrap section 88 into the product receiving location 34. The stripper plate 80 cooperates with the baffle 112 to prevent the scrap section 88 from moving out of alignment with the scrap receiving location 32.

The mandrel drive motor 124 has been illustrated schematically in FIGS. 5 and 6. However, it is contemplated that the mandrel drive motor 124 may be a piston and cylinder type motor which cooperates with the mandrel 50 in the same manner as is described in U.S. Pat. No. 5,214,988. Alternatively, a cam drive, a linear actuator, or any other desired type of drive assembly may be utilized.

Figure 7:
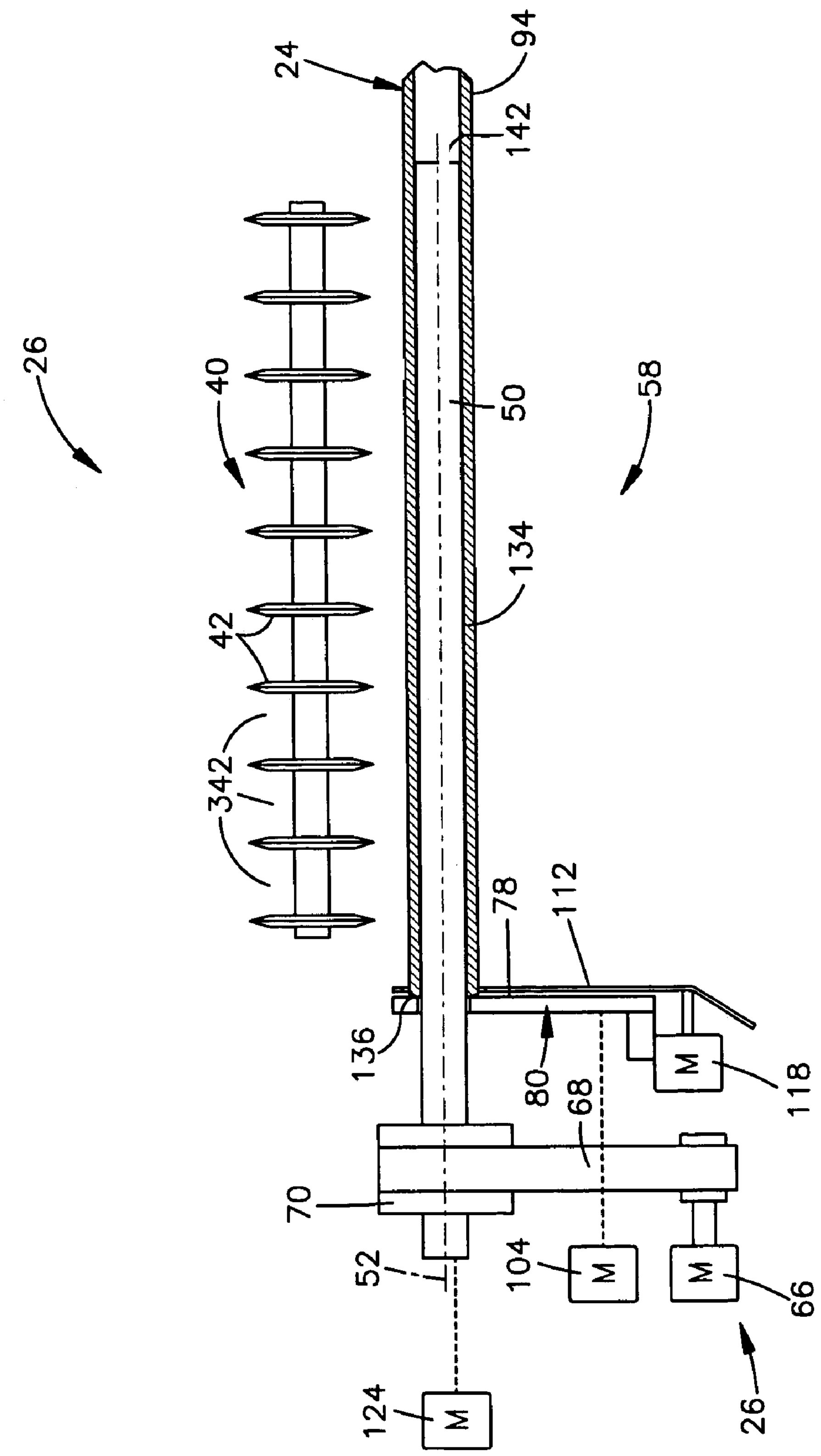
FIG. 7 is a schematic illustration, generally similar to FIGS. 2-6, depicting the manner in which a second portion of the tube and mandrel are moved into a telescopic relationship.

After the scrap section 88 and product sections 86 have been released from the mandrel and fallen into the receiving locations 32 and 34, the rotating mandrel is moved axially from the retracted position of FIG. 6 back to the extended position of FIG. 7 by operation of the mandrel drive motor 124. As this is occurring, the stripper plate 80 remains stationary in the retracted or home position shown in FIG. 6. Therefore, the stop surface 78 on the stripper plate 80 is spaced from the closest knife 42 by distance which is the same as the distance between adjacent knives in the linear array 40 of annular knives. The baffle motor 118 is operated to move the baffle 112 toward the left (as viewed in FIG. 6) to its retracted position closely adjacent to the stripper plate 80.

The next succeeding leading end portion 134 (FIG. 7) of the tube 24 is moved into the work station 58 by the tube feed assembly 22 (FIG. 1). As this occurs, the tube feed assembly 22 is effective to rotate the tube 24 about its longitudinal central axis and to move the tube along its longitudinal central axis. As the tube 24 moves its longitudinal central axis, the leading end portion 134 (FIG. 7) of the tube moves into a telescopic relationship with the rotating mandrel 50. If desired, the mandrel 50 may be moved axially from the retracted position to the extended position by the motor 124 as the tube 24 is moved into the work station 58 by the tube feed assembly 22. Therefore, the telescopic relationship between the tube 24 and the mandrel 50 is increased by movement of both the tube and mandrel. Of course, the mandrel 50 may be moved to its extended position before the leading end portion 134 of the tube is moved toward the mandrel.

At this time, the mandrel 50 is being rotated by the mandrel drive motor 66. The mandrel 50 is rotated in the same direction and at the same speed as in which the tube 24 is rotated by operation of the tube feed assembly 22.

As the leading end portion 134 (FIG. 7) of the rotating tube 24 is moved axially into the tube cutter assembly 26, the speed of axial movement of the tube is reduced immediately before the leading end surface 136 on the tube 24 moves into engagement with the stop surface 78 on the stripper plate 80. This prevents slamming of the leading end surface 136 of the tube 24 against the stop surface 78 on the stripper plate 80 in a manner which could damage the tube 24. Although the speed of axial movement of the tube 24 is reduced, the tube continues to rotate at the same speed as the mandrel 50.

Once the leading end surface 136 (FIG. 7) has engaged the stop surface 78 on the stripper plate 80, the tube feed assembly 22 is effective to continuously press the leading end surface 136 of the rotating tube 24 against the stop surface 78. While the leading end surface 136 of the tube 24 is being pressed against the stop surface 78, the rotating annular knives 42 are moved into engagement with the leading end portion 134 of the tube 24 to cut the tube in the same manner as previously explained in conjunction with FIG. 4.

After the leading end portion 134 of the tube 24 has been cut by the linear array 40 of knives 42, the main portion 94 of the tube 24 is moved toward the right (as viewed in FIG. 7). This forms a gap, corresponding to the gap 100 of FIG. 5, between the end of the main portion of the tube 24 and the product sections 86 formed by cutting the leading end portion 134 of the tube 24. This gap interrupts the transmission of force from the tube feed assembly 22 to the product sections 86 formed by cutting the leading end portion 134 of the tube 24. At this time the stripper plate 80 and baffle 112 are maintained in the side-by-side relationship shown in FIG. 7 and do not move along the central axis 52 of the mandrel 50.

After the leading end portion 134 of the tube 24 has been cut to form a plurality of product sections, all of the product sections are moved into the product receiving location 34. This is accomplished by retracting the mandrel 50 in the same manner as explained in conjunction with FIG. 6 herein. This pushes the product sections 86 off an end 142 of the mandrel 50. Continued retraction of the mandrel 50 results in the last product section dropping off the end 142 of the mandrel and moving downward into the product receiving location 34 (FIGS. 1 and 6).

Once the product sections 86 formed by cutting the portion 134 of the tube 24 have all been directed to the product receiving location 34 (FIG. 6), the leading end portion of the rotating tube 24 is again moved axially into the tube cutter assembly 26 at the work station 58. The leading end portion of the tube 24 is then cut in the manner previously explained. The product sections 86 resulting from cutting the tube 24 are all moved to the product receiving location 34.

Figure 8:
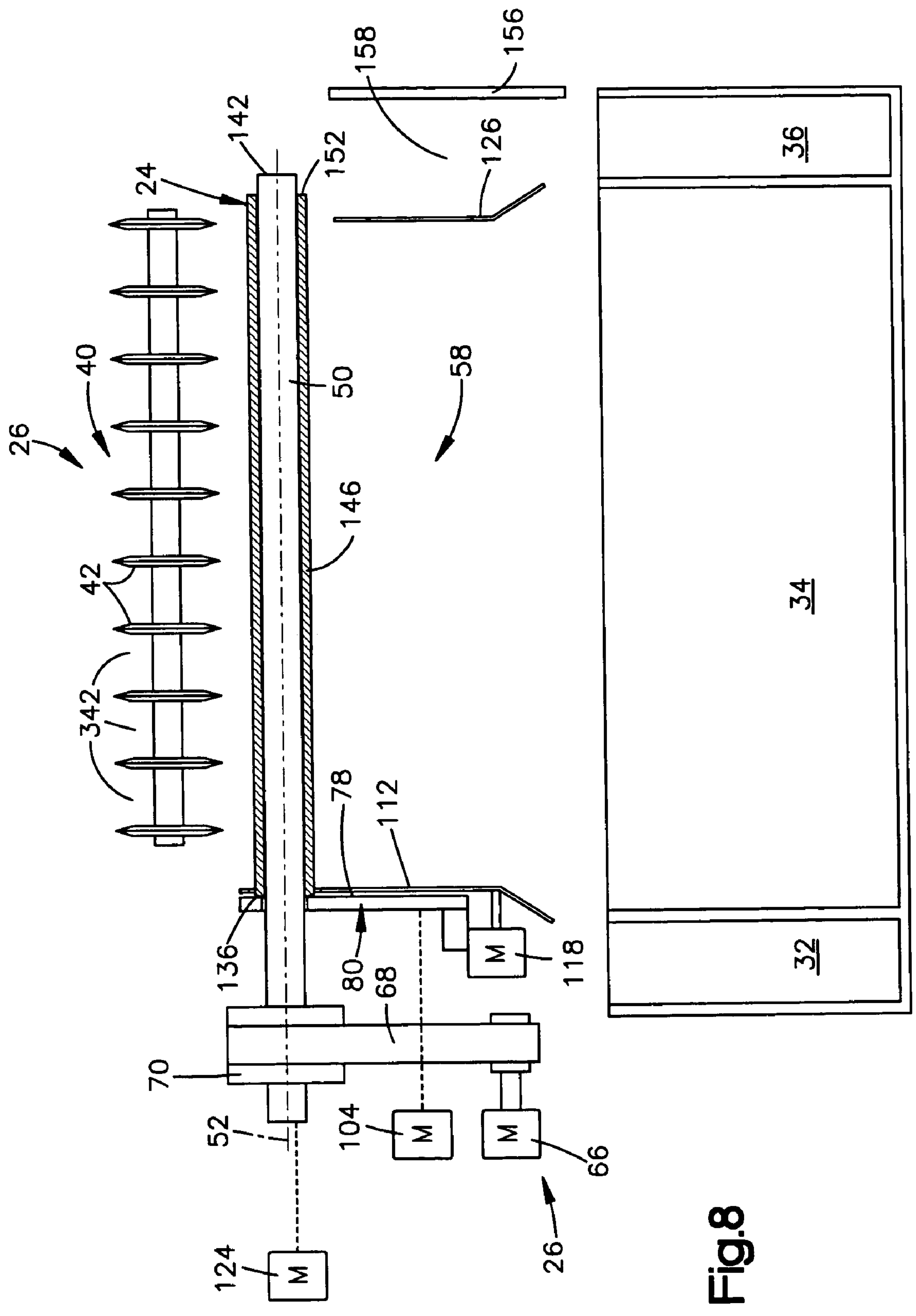
FIG. 8 is a schematic illustration, generally similar to FIGS. 2-7, depicting the manner in which a final portion of the tube and mandrel are moved into a telescopic relationship.

Cutting of the leading end portion of the rotating tube 24 is repeated until the final or last end portion 146 (FIG. 8) of the tube 24 to be is moved into the tube cutter assembly 26 at the work station 58 by the tube feed assembly 22 (FIG. 1). At this time, the stop surface 78 on the stripper plate 80 is spaced from the knife 42 which is closest to the stripper plate by a distance which is equal to the distance between adjacent knives 42 in the linear array 40 of annular knives. Thus, the stripper plate 80 and baffle 112 are in the same position as previously discussed in conjunction with FIG. 7.

In accordance with another feature of the present invention, the final portion 146 (FIG. 8) of the tube 24 is pushed onto the mandrel 50 by the leading end portion of the next succeeding tube 24. Thus, the trailing end of the final portion 146 of a first tube 24 is engaged by the leading end of a second tube 24 which is fed from the tube supply station 56 (FIG. 1) immediately after the first tube. The tube feed assembly 22 presses the leading end of the second tube 24 against the trailing end surface 152 (FIG. 8) on the final portion 146 of the first tube. The force transmitted from the second tube to the final portion 146 of the first tube is effective to shove the final portion of the first tube onto the mandrel 50.

While the knives 42 are being rotated by the knife drive motor 46 and while the mandrel 50 and final portion 146 of the tube 24 are being rotated by the mandrel drive motor 66, the linear array 40 of rotating knives 42 are moved into engagement with the final end portion 146 (FIG. 9) of the tube 24 to cut the final end portion. At this time, the final end portion 146 of the tube 24 is spaced from the tube feed assembly 22 and is rotated by engagement with the mandrel 50. The rotating leading end of the next succeeding tube presses the final portion 146 of the tube 24 against the stop surface 78 on the stripper plate 80.

As the knives 42 cut the final portion 146 of the tube 24, a plurality of product sections 86 are formed in the manner previously described in conjunction with FIG. 4. In accordance with another feature of the present invention, in addition to the product sections 86, a scrap section 150 (FIG. 9) is formed adjacent to the end 142 of the mandrel 50. The scrap section 150 contains the trailing end surface 152 of the tube 24. The product sections 86 all have the same length (axial extent). The scrap section 150 usually has a length which is less than the length of a product section 86. However, the scrap section 150 may have a length which is greater than the length of a product section 86.

Figure 9:
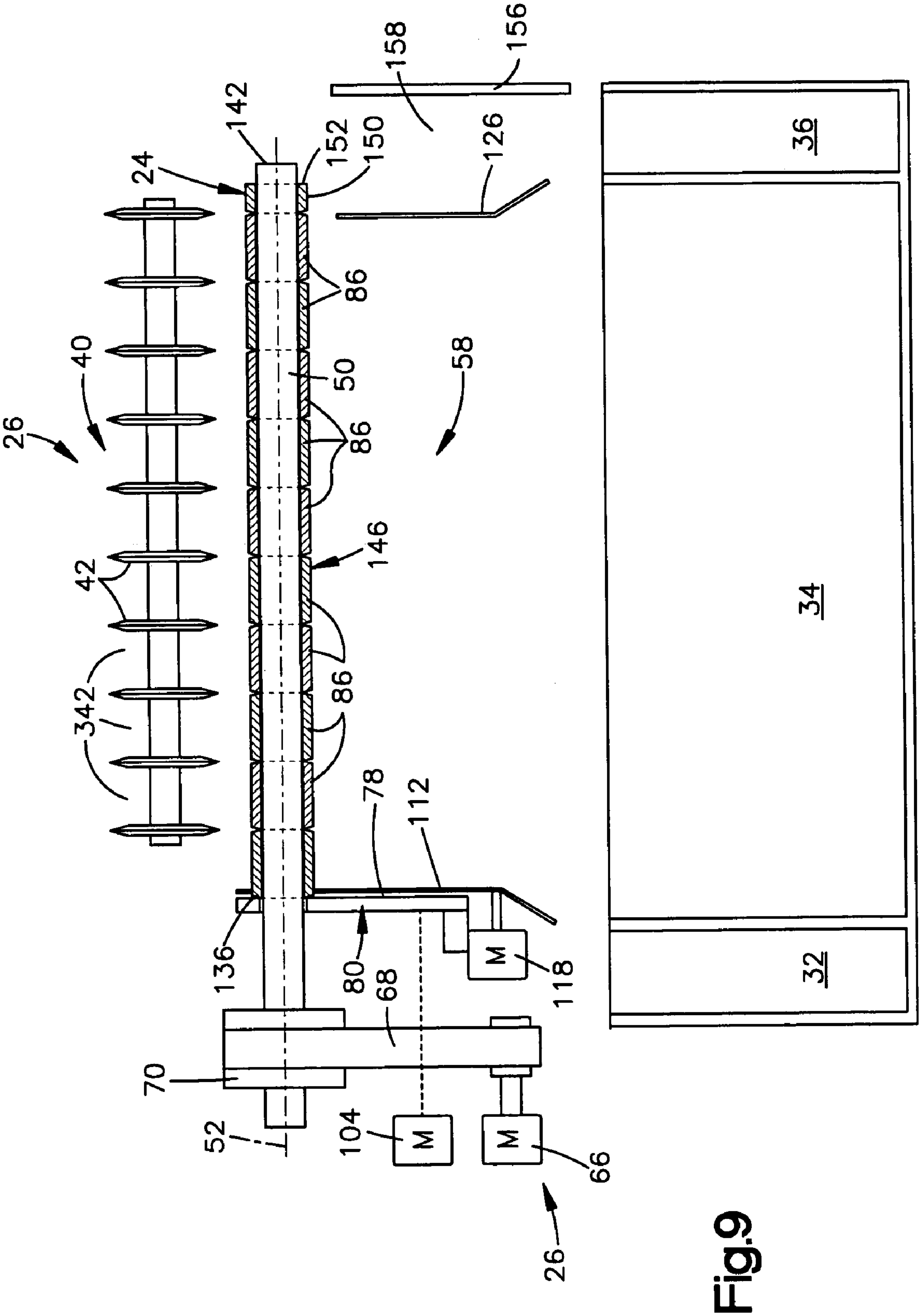
FIG. 9 is a schematic illustration, generally similar to FIGS. 2-8, depicting the manner in which the final portion of the tube is cut into a plurality of sections.

When the scrap section 150 and product sections 86 are to be disengaged from the mandrel, the mandrel is retracted to move the end 142 of the mandrel toward the left (as viewed in FIG. 9). In accordance with one of the features of the invention, the scrap section 150 is moved to a receiving location 36 spaced from the product receiving location 34. Thus, the scrap section 150 drops downward between the baffle 126 and an outer baffle 156. The two baffles 126 and 156 cooperate to form a channel 158 along which the scrap section 150 moves downward into the scrap receiving location 36.

As the mandrel 50 continues to be retracted, the product sections 86 are sequentially released and fall downward into the product receiving location 34 in the same manner as is illustrated schematically in FIG. 6. When the mandrel 50 reaches a fully retracted position, the product section 86 adjacent to the stripper plate 80 drops downward into the product receiving location 34. This results in the product sections 86 being disposed in the product receiving location 34 and the scrap section 150 being disposed in the scrap receiving location 36. Therefore, the product sections 86 are separated from the scrap section 150.

In the foregoing description, the receiving locations 32, 34 and 36 (FIGS. 1 and 9) have been bins disposed beneath the mandrel 50 (FIG. 1). However, it is contemplated that the receiving locations 32, 34 and 36 could have a different construction if desired. For example, conveyors may be provided with inlets at the receiving locations 32, 34, and 36.

Although one specific tube cutter assembly 26 and mode of operation have been described herein, it is contemplated that the tube cutter assembly may have a different construction and/or mode of operation. For example, the tube 24 may be provided with finished end portions and formation of scrap sections 88 and/or 150 may be eliminated. Of course, this eliminates the need for the scrap receiving locations 32 and/or 36. As another example, the tube 24 may be moved axially into the work station 58 without being rotated about its central axis.

Tube Feed Assembly

The tube feed assembly 22 (FIG. 1) includes a tube storage structure 166. The tube storage structure 166 includes a plurality of support members or rails 168 which slope downward toward the right (as viewed in FIG. 1). The tubes 24 are placed on the rails 168 with the longitudinal central axes of the tubes extending perpendicular to the longitudinal central axes of the rails 168. The downward sloping rails 168 cause the tubes 24 to accumulate in a side-by-side relationship adjacent the lower end portion of the rails. It should be understood that the tube storage structure 166 may have a different construction if desired.

The tubes 24 are sequentially moved from the-tube supply station 56 to the work station 58 by a tube feeder assembly 170. The tube feeder assembly 170 includes a main feed stand 174 which is disposed adjacent to the entrance to the work station 58. Secondary feed stands 176 are disposed adjacent to and are connected with lower end portions 178 of the tube support rails 168. Although three secondary feed stands 176 have been schematically depicted in FIG. 1, a greater or lesser number of secondary feed stands may be utilized. If desired, a unitary tube feeder assembly may be substituted for the secondary feed stands 176 and/or main feed stand 174.

The tubes 24 sequentially roll down the rails 168 (FIG. 1) to the secondary feed stands 176. After a tube 24 has moved to the secondary feed stands 176, the secondary feed stands are operated to move the leading end portion 54 of the tube axially toward the main feed stand 174 and the tube cutter assembly 26. The leading end portion 54 of the tube is engaged by the main feed stand 174 and is axially fed along a trough 182 into the tube cutter assembly 26.

As the tube 24 is fed by the main feed stand 174 and/or secondary feed stands 176, the longitudinal central axis of the tube 24 is coincident with a longitudinal central axis of the mandrel 50. The secondary feed stands 176 and main feed stand 174 cooperates to move the tube 24 axially into a telescopic relationship with the mandrel 50. The trough 182

(FIG. 1) has an arcuate bottom surface which is positioned so as to align the central axis of a tube 24 with the central axis 52 of the mandrel 50. If desired, the trough 182 may be omitted.

The feed stands 174 and 176 are effective to rotate the tube about its longitudinal central axis in the same direction and at the same speed as in which the mandrel 50 is rotated. Since the tube 24 is rotated about its central axis and moved along its central axis, the tube may be referred to as being fed along a spiral path. However, if desired, the tube 24 may be moved along its longitudinal central axis without being rotated.

Figure 10:
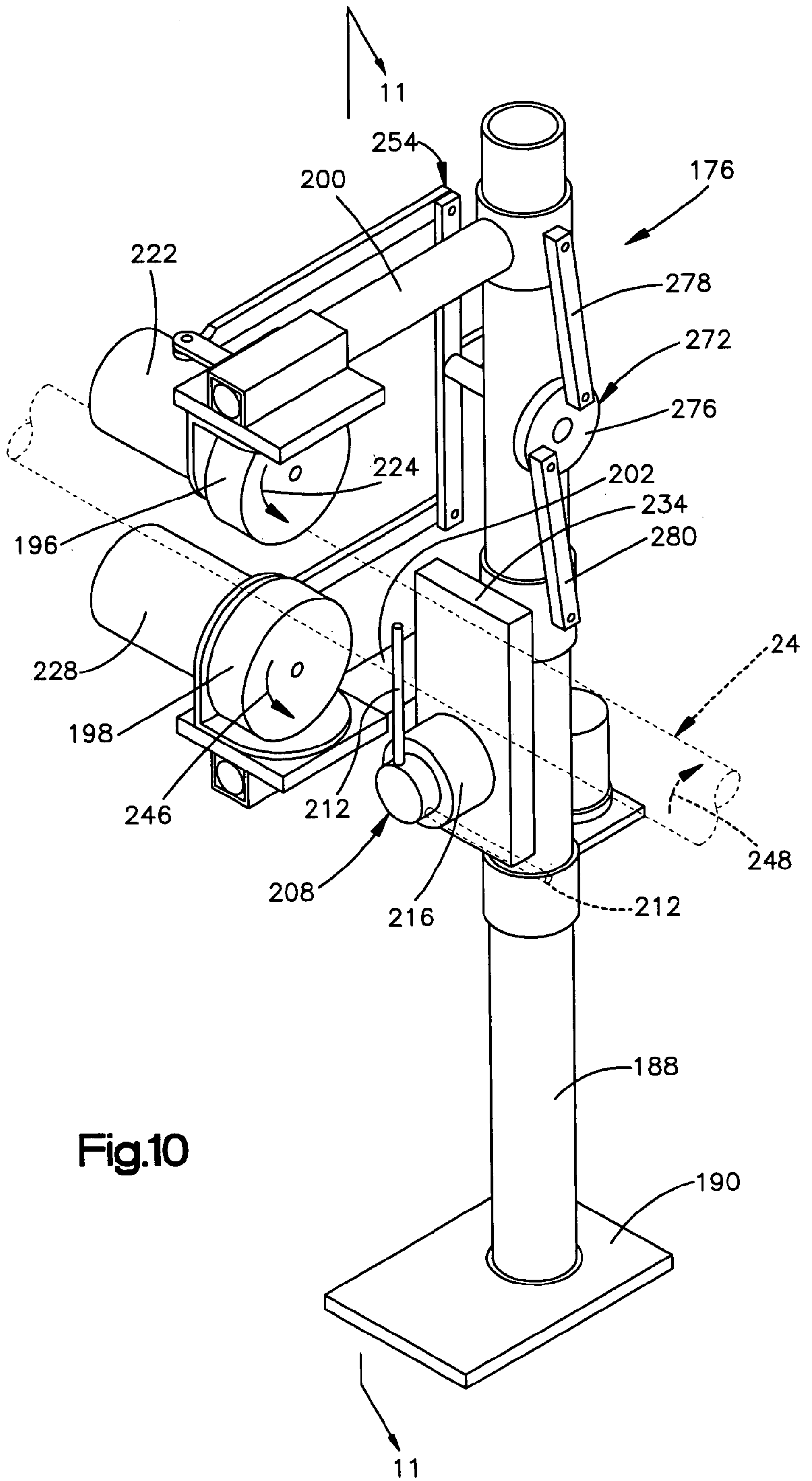
FIG. 10 is a schematic pictorial illustration depicting the construction of a tube feed stand in the apparatus of FIG. 1.
Figure 12:
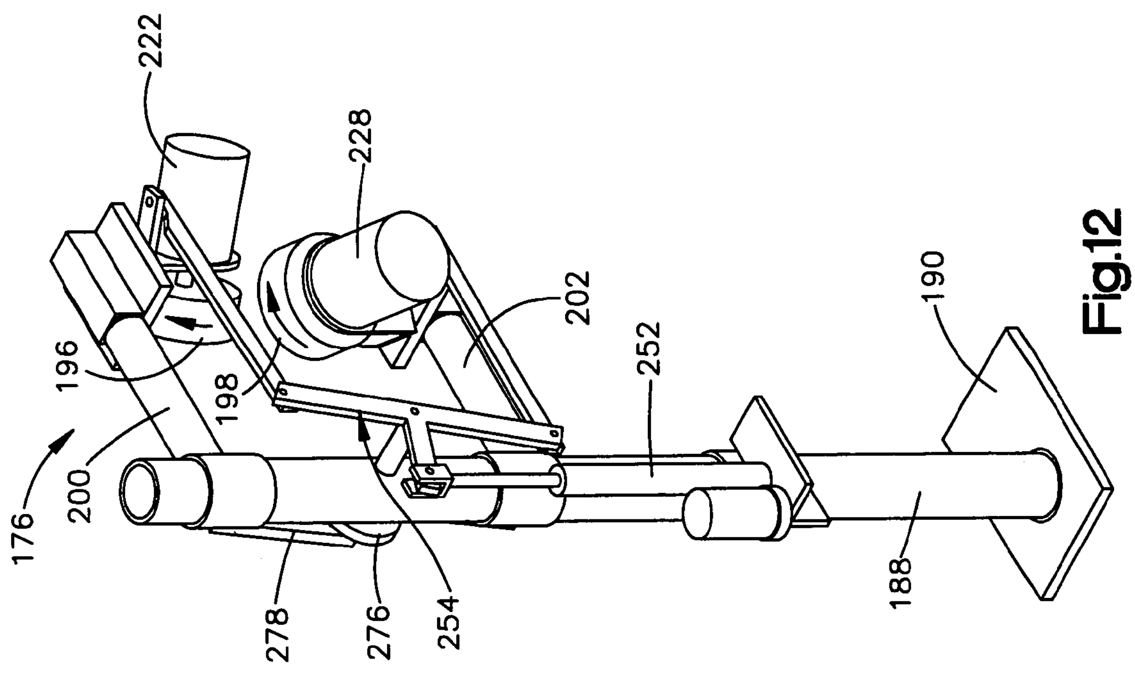
FIG. 12 is a schematic illustration, generally similar to FIG. 11, depicting the manner in which feed rollers on the feed stand are moved to a skewed relationship to effect axial and rotational movement of a tube.
Figure 11:
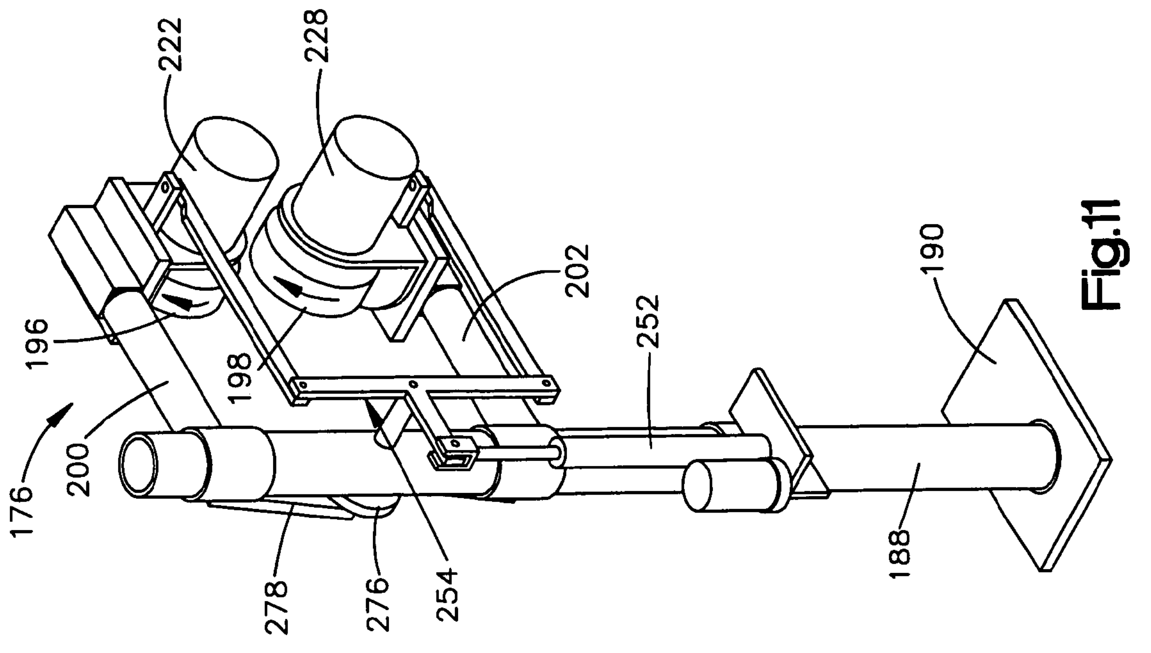
FIG. 11 is a side elevational view, taken generally along the line 11-11 of FIG. 10 further illustrating the construction of the feed stand.

A secondary feed stand 176 is illustrated schematically in FIGS. 10-12. The secondary feed stand 176 includes a vertical post 188 which extends upward from a base 190. Rotatable upper and lower feed rollers 196 and 198 are pivotally supported by upper and lower arms 200 and 202 which extend outward from the post 188. If desired, the upper and lower feed rollers 196 and 198 may be mounted on the secondary feed stand 176 in a different manner.

The upper and lower feed rollers 196 and 198 on the secondary feed stands 176 cooperate with each other to move the tube 24 from the tube storage structure 166 into the secondary feed stands. The upper and lower feed rollers 196 and 198 are then effective to move the tube 24 along its longitudinal central axis toward the main feed stand 174 and the tube cutter assembly 26. While the tube 24 is being moved along its longitudinal axis by the feed rollers 196 and 198 in the secondary feed stands 176 and/or by the feed rollers 196 and 198 in the main feed stand 174, the feed rollers are effective to rotate the tube about its central axis. If desired, the feed rollers 196 and 198 may be utilized to move the tube 24 along its central axis without rotating the tube about its central axis.

In addition to the feed rollers 198, gate assemblies 208 (FIG. 10) are mounted on the lower arms 202 of the secondary feed stands 176. The gate assemblies 208 control movement of a tube 24 from the tube storage structure 166 (FIG. 1) into engagement with the secondary feed stands 176. In addition, the gate assemblies 208 retain a tube 24 against movement out of engagement with the upper and lower feed rollers 196 and 198 in the secondary feed stands during axial movement of the tube 24 toward the main feed stand 174 and tube cutter assembly 26.

The gate assembly 208 (FIG. 10) on each of the secondary feed stands 176, includes a bar or finger 212 which is movable by a motor 216 between a retracted position, illustrated in dash lines in FIG. 10, and an extended position, illustrated in solid lines in FIG. 10. When the bar 212 is in the extended position, it extends between a tube 24 disposed in engagement with the feed rollers 196 and 198 and the array of tubes 24 disposed on the downwardly sloping rails 168 of the tube storage structure 166 (FIG. 1).

When the bar 212 is extended, the tubes 24 in the array of tubes on the rails 168 of the tube storage structure 166 apply force against the bar 212 and are separated from a tube 24 which is engaged by the feed rollers 196 and 198 (FIG. 10) in the secondary feed stands 176. Therefore, the tubes 24 in the tube storage structure 166 do not retard movement of the tube 24 engaged by the feed rollers 196 and 198 along the longitudinal central axis of the tube. In addition, the extended bar 212 blocks movement of a tube 24 engaged by the feed rollers 196 and 198 in a direction back toward the tube storage structure 166.

Although only a single gate assembly 208 has been illustrated in FIG. 10, it should be understood that there is a gate assembly connected with each of the secondary feed stands 176. All of the gate assemblies 208 have the same construction and mode of operation. The gate assemblies 208 connected with the secondary feed stands 176 perform the dual functions of blocking engagement of tubes 24 in the tube storage structure 166 with a tube 24 engaged by the feed rollers 24 and of blocking movement of a tube engaged by the feed rollers 196 and 198 back in a direction toward the tube storage structure 166.

The main feed stand 174 may include a gate assembly 208 to block movement of a tube 24 out of a nip between feed rollers 196 and 198. Alternatively the main feed stand 174 may have a stationary member, corresponding to the bar 212 in the gate assembly 208, to block movement of a tube out of the nip between the feed rollers 196 and 198. Other than having a stationary member rather than a bar 212 which is moved by a motor 216, the main feed stand 174 has the same construction as the secondary feed stands 176.

When a tube 24 is to be fed from the tube storage structure 166 into engagement with the secondary feed stands 176, the gate assembly motors 216 are operated to pivot the gate bars 212 from their extended positions shown in solid lines in FIG. 10 to their retracted positions shown in dashed lines in FIG. 10. Upon movement of the gate bars 212 to their retracted positions, the lowermost tube 24 on the support rails 168 (FIG. 1) in the tube storage structure 166 rolls downward into engagement with the feed rollers 196 and 198 (FIG. 10) in the secondary feed stands 176. At this time, motors 222 are operated to rotate the upper feed rollers 196 in a counterclockwise direction, as indicated by the arrow 224 in FIG. 10. Lower feed motors 228 are in a deenergized condition so that the lower feed rollers 198 are not driven by the lower motors 228.

The rotating upper feed rollers 196 in the secondary feed stands 176 apply force to the lowermost tube 24 on the tube storage structure 166 (FIG. 1). The force applied against the tube 24 by the upper feed rollers 196 cause the tube 24 to roll in a clockwise direction, as viewed in FIG. 10, into the secondary feed stands 176. As the upper feed rollers 196 apply force against the tube 24 to move the tube into the nip between the upper and lower feed rollers 196 and 198, the lower feed roller 198 may be rotated in a clockwise direction by force applied against the lower feed roller by the tube 24.

Inward, that is rightward as viewed in FIG. 10, movement of the tube 24 toward the post 188 of the secondary feed stand 176 is blocked by a stop member 234 when the tube moves into the nip between the upper and lower feed rollers 196 and 198. When this occurs, operation of the upper feed roller motor 222 is interrupted. In addition, the gate assembly motor 216 is operated to pivot the gate bar 212 from its retracted position shown in dashed lines in FIG. 10 to its extended position shown in solid lines in FIG. 10. At this time, the longitudinal central axis of the tube 24 is coincident with the central axis 52 (FIG. 2) of the mandrel 50.

To initiate interruption of operation of the upper feed motor 222 and to initiate operation of the gate assembly motor 216 to pivot the bar 212 (FIG. 10) to its upright position, a limit switch (not shown) is connected with the stop member 234. The limit switch is connected with a controller 238 (FIG. 1) by a lead 240. The controller 238 controls operation of the upper feed motor 222, lower feed motor 228, and the gate motor 216.

Although only one of the secondary feed stands 176 has been illustrated in FIG. 10, it should be understood that each of the secondary feed stands 176, (FIG. 1) has the same construction and mode of operation. The number of secondary feed stands 176 provided in association with the tube storage structure 166 will depend upon the length of a tube 24. Thus, if the tube has a relatively short length, for example, six feet, only two or three secondary feed stands may be associated with the tube storage structure 166. However, if the tube 24 has a relatively long length, for example, twenty-four feet, additional secondary feed stands 176 would be associated with the tube storage structure 166.

The tube 24 has an overall initial length which is a function of the spacing between the knives 42 (FIGS. 2 and 3) and the length of the product sections 86 (FIGS. 5 and 6). The knives 42 are spaced apart by a distance corresponding to the desired axial extent of a product section 86 (FIGS. 5 and 6). The array 40 of knives 42 is effective to cut a length of tube which is equal to the desired length of the product sections 86 times the number of knives during cutting of portions of the tube 24 other than the leading or trailing end portions of the tube. The length of the tube 24 cut in one cycle of operation of the tube cutter assembly 26, during cutting of portions of the tube other than the leading end portion (FIG. 3) or trailing end portion (FIG. 8), may be referred as the cut length of the tube. The cut length of the tube is equal to the number of knives 42 times the spacing between adjacent knives.

The tube 24 has an initial overall length which is a whole number multiplied by the cut length of the tube. For example, if each of the product sections 86 (FIG. 4) is to have a length of three inches and there are ten knives 42, the cut length of the tube would be thirty inches. The tube 24 would initially have an overall length which is a whole number times the cut length of thirty inches. For example, the tube 24 may have an overall length of eight times the cut length or two hundred and forty inches. The foregoing specific dimensions for the product sections 86, cut length of the tube 24, and overall length of the tube should be consider as being exemplary of many different dimensions which may be used. It should also be understood that a greater or lesser number of knives 42 may be used.

The number of product sections 86 formed during cutting of the tube 24 is one less than the initial overall length of the tube divided by the desired length of product sections. In the foregoing example, if the tube 24 had an overall length of two hundred and forty inches and if each of the product sections had an axial length of three inches, processing the two hundred and forty inch tube through the tube cutter assembly 26 would result in the formation of seventy nine product sections 86 and two scrap sections 88 (FIG. 4) and 150 (FIG. 9). The two scrap sections 88 and 150 may have a combined axial length which is equal to or less than the axial length of one of the product sections 86.

In the foregoing example, the tube 24 was relatively accurately cut to a desired overall length of two hundred and forty inches. It is contemplated that the tube 24 may have a length which is greater than two hundred and forty inches. This may result in the scrap section 150 having a length which is greater than the length of one or more product sections 86.

When the tube 24 is to be moved into engagement with the upper and lower feed rollers 196 and 198, the feed rollers are disposed in the positions illustrated schematically in FIGS. 10 and 11. At this time, the axes about which the feed rollers 196 and 198 rotate extend parallel to each other and parallel to the longitudinal central axis of a tube 24 (FIGS. 1 and 10) to be fed into the nip between the feed rollers. It should be understood that FIG. 11 has been simplified, for purposes of clarity of illustration, by elimination of the gate assembly 208 and stop member 234 from the secondary feed stand 176.

When a tube 24 is to be fed into the nips between the upper and lower feed rollers 196 and 198 on the secondary feed stands 176, the gate motors 216 are operated to pivot the gate bars 212 from the upright orientation illustrated in solid lines in FIG. 10 to the retracted orientation shown in dashed lines in FIG. 10. The upper feed roller motors 222 are then energized to rotate the upper feed rollers 196 in each of the secondary feed stands 176 about their coincident central axes. This moves the lowermost tube 24 on the tube storage structure 166 into the nips between the upper and lower feed rollers 196 and 198 on the secondary feed stands 176. At this time the lower feed roller motors 228 are deenergized.

As the tube 24 moves into the secondary feed stands 176, the tube engages the stop members 234 (FIG. 10). Engagement of the tube 24 with the stop members 234 actuates limit switches connected with the stop members 234 and the controller 238. This signals the controller 238 to operate the gate assemblies 208 to move the bars 212 back to their upright orientation.

When the tube 24 is disposed in engagement with the secondary feed stands 176 in the manner illustrated in FIG. 10, the controller 238 (FIG. 1) effects operation of the upper and lower feed roller motors 222 and 228 (FIGS. 10 and 11) to rotate the feed rollers 196 and 198 in the same direction, about parallel axes. The feed rollers 196 and 198 are rotated in a counterclockwise direction as viewed in FIG. 10. Thus, the upper feed roller 196 is rotated in the direction of the arrow 224 and the lower feed roller 198 is rotated in the direction of an arrow 246. This results in the tube 24 being rotated in a clockwise direction (as viewed in FIG. 10) about its longitudinal central axis, in the manner indicated by an arrow 248.

At this time, the stop member 234 and bar 212 of the gate assembly 208 cooperate to hold the tube 24 centered in the nip between the upper and lower feed rollers 196 and 198. Thus, at this time, the longitudinal central axis of the tube 24 and the parallel axes about which the feed rollers 196 and 198 rotate are disposed in a single vertical plane. The longitudinal central axis of the rotating tube 24 is aligned with the central axis 52 (FIG. 2) of the mandrel 50.

When the rotating tube 24 is to be fed to the tube cutter assembly 26, that is, toward the left as viewed in FIG. 10, the upper and lower feed rollers 196 and 198 are moved at a controlled rate from the initial positions illustrated in FIGS. 10 and 11 to the skewed positions illustrated in FIG. 12. When the upper and lower feed rollers 196 and 198 are in the positions illustrated in FIG. 12, the axes about which the feed rollers rotate are skewed in opposite directions and at equal angles relative to the longitudinal central axis of the tube 24. This results in the application of a force component to the tube 24 to move the tube along its longitudinal central axis in a direction toward the tube cutter assembly 26.

The tube 24 is simultaneously rotated about its longitudinal central axis and moved along its longitudinal central axis by the feed rollers 196 and 198 on the secondary feed stands 176. Therefore, the rotating tube 24 is axially moved toward the left (as viewed in FIGS. 1 and 10) toward the tube cutter assembly 26. At this time, the tube 24 is disposed in a coaxial relationship with the mandrel 50.

Although only a single secondary feed stand 176 has been illustrated in FIGS. 12, it should be understood that the upper and lower feed rollers 196 and 198 in all of the secondary feed stands 176 and in the main feed stand 174 are in the same skewed orientation (FIG. 12) relative to the tube 24 to be fed into the tube cutter assembly 26. It should also be understood that the feed rollers in all of the secondary feed stands 176 and the main feed stand 174 are rotated at the same speed. The upper feed rollers 196 in the secondary feed stands 176 and main feed stand 174 have parallel central axes. The parallel axes of the upper feed rollers 196 in the secondary feed stands 176 and main feed stand 174 are all skewed at the same angle relative to the central axis of the tube 24. The upper feed rollers 96 are all rotated at the same speed in a counterclockwise direction (as viewed in FIGS. 1 and 10).

It should be understood that the tube processing apparatus 20 may be set up so as to have the tube feed assembly 22 disposed at the left (as viewed in FIG. 1) of the tube cutter assembly 26. Of course, the components of tube cutter assembly 26 would be constructed so as to enable tubes 24 to be received from the left rather than the right. This would result in a reversal of the direction of rotation of the upper and lower feed rollers 196 and 198.

The lower feed rollers 198 in the secondary feed stands 176 and main feed stand 174 have parallel central axes. The parallel axes of the lower feed rollers 198 in the secondary feed stands 176 and main feed stand 174 are all skewed at the same angle relative to the central axis of the tube 24. The lower feed rollers 198 are all rotated in a counterclockwise direction (as viewed in FIGS. 1 and 10). The angle at which the lower feed rollers 198 are skewed relative to the central axis of the tube 24 has the same magnitude as the angle at which the upper feed rollers 196 are skewed relative to the central axis of the tube. The parallel axes about which the lower feed rollers 198 are rotated are all skewed at the same angle relative to the parallel axes about which the upper feed rollers 196 are rotated.

The upper feed rollers in all of the secondary feed stands 176 and main feed stand 174 are always disposed in the same orientation relative to the longitudinal central axis of the tube 24. Thus, when the tube 24 is to be fed into the tube cutter assembly 26, all of the upper feed rollers 196 in the secondary feed stands 176 and main feed stand 174 are skewed at the same angle relative to the longitudinal central axis of the tube 24 being moved toward the tube cutter assembly 26. For example, all of the upper feed rollers 196 in the secondary feed stands 176 and main feed stand 174 may be disposed in the same orientation as is illustrated in FIG. 12 for the upper feed roller 196 in one of the secondary feed stands 176. At this time, the axis about which the upper feed roller 196 is rotating is skewed at an acute angle to the longitudinal central axis of the tube 24 to be fed. This acute angle may, for example, be approximately forty degrees.

Similarly, all of the lower feed rollers 198 in the secondary feed stands 176 and main feed stand 174 are always disposed in the same orientation relative to the longitudinal central axis of a tube 24. Thus, when the tube 24 is to be fed into the cutter assembly 26, all the lower feed rollers 198 in the secondary feed stands 176 and main feed stand 174 are skewed at the same angle relative to the longitudinal central axis of the tube 24. At this time, the lower feed rollers 198 are rotating about axes which are skewed at the same acute angle relative to the longitudinal central axis of the tube 24. The size of the angle at which the lower feed rollers 198 are skewed relative to the longitudinal central axis of the tube 24 is the same as the size of the angle at which the upper feed rollers 196 are skewed relative to the longitudinal central axis of the tube 24. However, the upper and lower feed rollers 196 and 198 are skewed in opposite directions relative to the longitudinal central axis of the tube 24 to have offsetting transverse forces applied to upper and lower sides of the tube 24.

In the foregoing example, the lower feed rollers 198 would be rotating about axes which are skewed at forty degrees relative to the longitudinal central axis of the tube 24, that is, at the same angle as the upper feed rollers 196. However, the axes about which the lower feed rollers 198 are rotating are skewed relative to the axes about which the upper feed rollers 196 are rotating. In the foregoing example in which the upper and lower feed rollers 196 and 198 are both rotating about axes which are skewed at forty degrees relative to a longitudinal central axis of a tube 24, the axes about which the upper and lower feed rollers 196 and 198 are rotating would be skewed at an angle of eighty degrees relative to each other. It should be understood that the foregoing specific size of the angle at which the upper and lower feed rollers are skewed, that is, forty degrees, has been set forth herein only for purposes of clarity of illustration and not for purposes of limitation of the invention.

As the tube 24 is fed into the tube cutter assembly 26, the tube is rotated about its longitudinal central axis under the combined influence of forces applied to the tube by the skewed upper and lower feed rollers 196 and 198 in the secondary feed stands 176 and main feed stand 174. The tube 24 is rotated about its central axis at the same speed and in the same direction as the mandrel 50. However, tube 24 may be rotated at a speed which is either greater than or less than the speed of rotation of the mandrel. The mandrel 50 and the tube 24 are disposed in a coaxial relationship.

As the rotating tube 24 is fed axially into the tube cutter assembly 26, the tube moves into a telescopic relationship with the mandrel 50. The leading end portion 54 (FIG. 1) of the tube slides along the mandrel 50 toward the stop surface 78 (FIGS. 2 and 3) on the stripper plate 80. If desired, the mandrel 50 may be moved from its retracted condition to its extended condition by the motor 124 (FIG. 4) as the tube 24 is moved along the mandrel by the feed stands 174 and 176. Shortly before the leading end 74 (FIG. 3) of the tube 24 engages the stop surface 78 on the stripper plate 80, the speed of axial movement of the tube 24 is decreased.

To decrease the speed of axial movement of the tube 24, the angle at which the upper and lower feed rollers 196 and 198 in both the main feed stand 174 and secondary feed stands 176 are skewed relative to the longitudinal central axis of the tube 24 is decreased. Thus, in the foregoing example, the angle at which the upper and lower feed rollers are skewed relative to the longitudinal central axis of the tube 24 may be decreased from forty degrees to ten degrees. This would result in the speed of forward movement of the tube 24 being decreased even though the speed of rotation of the upper and lower feed rollers 196 and 198 remains constant. As the speed of forward movement of the tube 24 is decreased, the speed of rotation of the tube is increased. It should be understood that the speed of movement of the tube 24 relative to the stripper plate 80 may be decreased by decreasing the speed of operation of the upper and lower feed roller motors 222 and 228.

The angle at which the upper and lower feed rollers 196 and 198 in the main feed stand 174 and secondary feed stands 176 are skewed relative to the central axis of the tube 24 is simultaneously changed by the controller 238. The feed rollers 196 and 198 are moved to change the angle at which they are skewed relative to the central axis of the tube 24 by operation of a positioning motor 252 (FIGS. 11 and 12). The positioning motor 252 is mounted on the post 188 and is connected with a linkage assembly 254.

When the positioning motor 252 is operated from the retracted condition illustrated in FIG. 11 to the extended condition illustrated in FIG. 12, the linkage assembly 254 is operated to pivot the upper and lower feed rollers 196 and 198 and upper and lower feed motors 222 and 228 from the parallel orientation illustrated in FIG. 11 to the skewed orientation illustrated in FIG. 12. The extent to which the feed roller axes are skewed relative to the longitudinal central axis of the tube 24 is varied by varying the extent to which the linkage assembly 254 is operated by the positioning motor 252.

When the tube 24 is to be moved away from the tube cutter assembly 26 in the manner illustrated by the arrow 96 in FIG. 5, the positioning motor 252 is retracted to operate the linkage assembly 254 to reverse the angle at which the feed rollers 196 and 198 are skewed relative to the tube 24. This results in the tube 24 being moved along its central axis in a direction away from the tube cutter assembly 26. Of course, the direction of rotation of the feed rollers 196 and 198 may be reversed to move the tube 24 away from the tube cutter assembly 26 if desired.

In view of the foregoing, it is apparent that when the tube 24 is to be moved into the tube cutter assembly 26, the feed rollers 196 and 198 are skewed relative to the longitudinal central axis of the tube in the manner illustrated schematically in FIG. 12. This results in the tube 24 being simultaneously rotated about its central axis and moved along its central axis in a direction toward the tube cutter assembly 26. When the speed of forward movement of the tube 24 into the tube cutter assembly 26 is to be reduced, the positioning motor 252 is operated to reduce the angle in which the central axes of the feed rollers 196 and 198 are skewed relative to each other. When the tube 24 is to be withdrawn from the tube cutter assembly 26, the positioning motor 252 is retracted from the position illustrated in FIG. 11 to operate the linkage 254 to reverse the angles at which the feed rollers 196 and 198 are skewed relative to each other.

The operation of the feed roller drive motors 222 and 228, the positioning motor 252 (FIGS. 11 and 12), and the gate motor 216 are all controlled by the controller 238 (FIG. 1). Thus, the upper and lower feed motors 222 and 228 are connected with the controller 238 by leads indicated at 260 and 262 in FIG. 1. The positioning motor 252 is connected with the controller 238 by a lead indicated at 264 in FIG. 1.

The controller 238 operates the positioning motors 252 in each of the secondary feed stands 176 and the main feed stand 174 to maintain the upper and lower feed rollers 196 and 198 in all of the feed stands in the same orientation. Thus, when the feed rollers 196 and 198 are being rotated about parallel axes in the manner illustrated in FIG. 10 and 11, the upper and lower feed rollers 196 and 198 in all of the secondary stands 176 and the main stand 174 are rotated about parallel axes. When the upper and lower feed rollers 196 and 198 are being rotated about skewed axes, in the manner illustrated schematically in FIG. 12, the upper and lower feed rollers in all of the secondary feed stands 176 and the main feed stand 174 are rotated about skewed axes.

When a tube 24 is being moved along its central axis, upper feed roller drive motors 222 in the secondary feed stands 176 and the main feed stand 174 are operated at the same speed and direction. Similarly, the lower feed roller drive motors 228 in the secondary feed stands 176 and main feed stand 174 are operated at the same speed and direction. The upper and lower feed roller drive motors 222 and 228 are all operated at the same speed and rotate in the same direction as the tube 24 is being moved along its central axis.

When a tube 24 is to be fed from the tube support structure 166, the controller 238 effects operation of all the upper feed roller drive motors 222 at the same speed and in the same direction in the secondary feed stands 176 and the main feed stand 174. This results in all of the upper feed rollers 196 being rotated in a counterclockwise direction (as viewed in FIG. 10) to move a tube 24 from the tube storage structure into the secondary feed stands. At this time, that is, during the feeding of a tube from the tube storage structure 166 to the secondary feed stands 176, the lower feed motor drive motors 228 (FIGS. 10 and 11) are in a nonoperating condition. The lower feed rollers 198 in the secondary feed stands 176 are moved only under the influence of force transmitted from the tube 24 as it is moved into the secondary feed stands 176 under the influence of force applied against the tube by the upper feed rollers 196. At this time, the positioning motors 252 in all of the secondary feed stands 176 and the main feed stand 174 are in the initial position illustrated in FIG. 11. Therefore, the central axes of the upper and lower feed rollers 196 and 198 in all of the secondary feed stands and the main feed stand 174 extend parallel to each other and to the longitudinal central axis to the tube 24.

When the tube 24 is to be advanced from the secondary feed stands 176 through the main feed stand 174 into the tube cutter assembly 26, the controller 238 effects simultaneous operation of all of the positioning motors 252 (FIG. 11) in the secondary feed stands 176 and the main feed stand 174 to move the upper and lower feed rollers 196 and 198 to the skewed orientation of FIG. 12. When this occurs, the rollers are effective to apply a component of force to the tube 24 to urge the tube 24 toward the left (as viewed in FIG. 1). At the same time, the upper and lower feed rollers 196 and 198 in the secondary feed stands 176 are effective to rotate the tube about its longitudinal central axis.

When the axes about which the upper and lower feed rollers 196 and 198 rotate are moved from the parallel relationship of FIGS. 10 and 11 toward the skewed relationship of FIG. 12, the speed of rotation of the tube 24 is decreased. At the same time, the speed of movement of the tube 24 along its longitudinal central axis is increased. As an angle between the axes of rotation of the upper and lower feed rollers 196 and 198 increases, that is as the axes of the feed rollers move away from the parallel relationship of FIG. 10 toward the skewed relationship of FIG. 12, the tube 25 accelerates in a direction toward the tube cutter assembly 26. At the same time, the speed of rotation of the tube 24 about is central axis decreases.

The leading end portion 54 (FIG. 1) of the tube 24 advances into the nip between the upper and lower feed rollers 196 and 198 in the main feed stand 174 while the tube is being rotated about its longitudinal central axis. Under the combined influence of the force applied against the tube 24 by upper and lower feed rollers in the secondary feed stands 176 and the main feed stand 174, the leading end portion 54 of the tube 24 advances through the main feed stand 174 and along the trough 182 (FIG. 1) toward the mandrel 50. The longitudinal central axis of the advancing tube 24 is coincident with the longitudinal central axis of the mandrel 50. Therefore, as the tube 24 continues to advance, the leading end portion 54 of the tube 24 moves into a telescopic relationship with the mandrel 50.

When the leading end portion 54 of the tube 24 has advanced to a location close to the stop surface 78 on the stripper 80 (FIG. 3), the controller 238 effects operation of the positioning motors 252 in the secondary feed stands 176 and main feed stand 174 to reduce the angle at which the central axes of the feed rollers 196 and 198 are skewed relative to the longitudinal central axis of the tube 24. Thus, the positioning motors 252 in the secondary feed stands 176 and main feed stand 174 are operated from the extended position of FIG. 12 part way back to the initial position of FIG. 11. As this occurs, the force component applied to the tube 24 by the feed rollers 196 and 198 in a direction extending parallel to the longitudinal central axis of the tube is reduced.

This reduces the speed of movement of the tube 24 into the tube cutter assembly 26 and increases the speed of rotation of the tube. Therefore, the tube 24 is moving slowly forward (toward the left as viewed in FIGS. 1 and 3) when the leading end 74 (FIG. 3) of the tube 24 moves into engagement with the stop surface 78 on the stripper plate 80. This minimizes the possibility of damaging the tube 24 by engagement with the stop surface 78 and minimizes any tendency for the tube to rebound from the stop surface.

During the subsequent cutting of the tube 24, the controller 238 (FIG. 1) maintains the positioning motors 252 (FIGS. 10, 11 and 12) in a condition in which the feed rollers are effective to apply a relatively small component of force along the axis of the tube 24. This relatively small component of force continuously presses the leading end 74 (FIG. 3) of the tube 24 against the stop surface 78. At the same time, the feed rollers 196 and 198 are rotated by the feed motor drive motors 222 and 228 to rotate the tube 24 at the same speed as the speed of rotation of the mandrel 50. Therefore, there is essentially no relative rotation between the mandrel 50 and the tube 24.

After the tube 24 has been cut by the knives 42, the main portion 94 (FIG. 5) of the tube 24 is moved away from the leading end portion 54 of the tube to form the gap 100. To move the main portion of the tube 24 away from the leading end portion 54 of the tube, the controller 238 (FIG. 1) effects operation of the positioning motors 252 in the secondary feed stands 176 and main feed stand 174 to move the upper and lower feed rollers 196 and 198 back to the position shown in FIG. 11. At this time, the central axes of the feed rollers are parallel to each other. The controller 238 continues operation of the positioning motors 252 to move the upper and lower feed rollers 196 and 198 to positions in which they are skewed relative to the longitudinal central axis of the tube 24 in a direction opposite to the direction illustrated in FIG. 12. This results in the feed rollers 196 and 198 being effective to apply a component of force to the main portion 94 of the tube 24 urging the tube toward the right (as viewed in FIG. 1).

After the tube 24 has been moved through a short distance toward the right, the controller 238 effects operation of the positioning motors 252 in the secondary feed stands 176 and the main feed stand 174 to again position the feed rollers 196 and 198 so that their central axes are parallel to each other. This results in the establishment of the gap 100 between the main portion 94 of the tube 24 and the leading end portion 54 of the tube (FIG. 5). Although the gap 100 has been illustrated in FIG. 5 as being so small that the main portion 94 of the tube 24 remains in a telescopic relationship with the mandrel 50, the gap could be larger and the main portion 94 of the tube may be moved out of telescopic relationship with the mandrel 50.

It is contemplated that tubes 24 of different diameters may be stored in the tube storage structure 166 and cut in tube cutter assembly 26. In order to enable the secondary feed stands 176 and main feed stand 174 to accommodate tubes of different diameters, a tube size adjustment assembly 272 (FIG. 10) is connected with the upper and lower feed rollers 196 and 198. Operation of the tube size adjustment assembly 272 is effective to move the upper and lower arms 200 and 202 in opposite directions relative to a longitudinal central axis of a tube 24 to vary the size of the nip between the feed rollers 196 and 198.

When a relatively small tube is to be fed from the tube storage structure 166, the tube size adjustment assembly 272 is operated to move the upper feed roller 196 downward (as viewed in FIG. 10) and to move the lower feed roller 198 upward. Similarly, when a relatively large tube is to be fed from the tube storage structure 166, the tube size adjustment assembly 272 is operated to move the upper feed roller 196 upward and to move the lower feed roller 198 downward. The upper and lower feed rollers 196 and 198 are moved in opposite directions so that a central axis of the nip in the feed rollers is at the same height above the base 190 regardless of the size of a tube 24 to be fed between the feed rollers. Therefore, the longitudinal central axis of a relatively small diameter tube and the longitudinal central axis of a relatively large diameter tube are both disposed at the same height above the base 190 and are both coaxial with the mandrel 50.

The rails 168 (FIG. 1) in the tube storage structure 166 are moved vertically with the lower arm 202 and lower feed roller 198. This enables either a large diameter tube 24 or a small diameter tube to be fed from the rails 168 past by the stationary lower feed rollers 198 into the secondary feed stands 176. The right (as viewed in FIG. 1) end portions of the rails 168 are connected with the lower arms 202 (FIG. 10) of the secondary feed stands 176 for vertical movement with the lower feed rollers 198.

The tube size adjustment assembly 272 includes a rotatable actuator disc 276 which is rotatably mounted on the post 188 midway between the upper arm 200 and lower arm 202. A link 278 connects the actuator disc 276 with the upper arm 200. Similarly, a link 280 connects the actuator disc 276 with the lower arm 202 by rotation of the actuator disc 276, the upper and lower arms 200 and 202 are moved in opposite directions through the same distance along the post 188.

When the size of the tube 24 to be fed from the tube structure 166 (FIG. 1) changes, the size of the mandrel 50 is changed. A mandrel 50 having a small outside diameter is used when a tube 24 having a relatively small inside diameter is to be fed to the tube cutter assembly 26. Similarly, a mandrel 50 having a large outside diameter is used when a tube 24 having a relatively large inside diameter is to be fed to the tube cutter assembly 26. The size of the mandrel 50 is selected so as to enable the tube 24 to move into a telescopic relationship with the mandrel and to support the leading end portion 54 of the tube during cutting of the tube.

When the final end portion 146 (FIG. 8) of a tube 24 is to be fed to the tube cutter assembly 26, the final end portion of the tube is pushed into the tube cutter assembly by the leading end of the next succeeding tube. When the final end portion 146 of the tube 24 has sufficient length, the leading end portion of the final end portion 146 of the tube is initially moved into a telescopic relationship with the right (as viewed in FIG. 8) end portion of the mandrel 50 while the trailing end portion of the final end portion of the tube is engaged by the main feed stand 174. The upper and lower feed rollers 196 and 198 in the main feed stand 174 apply force to the final end portion 146 of the tube to rotate the final end portion of the tube and to move the final end portion of the tube along its longitudinal axis. This increases the telescopic relationship between the mandrel 50 and the final end portion 146 of the tube 24.

Thereafter, the trailing end 152 (FIG. 8) of the final end portion 146 of a first tube 24 is engaged by the leading end of the next succeeding or second tube 24. When the final end portion of the first tube has moved clear of the main feed stand 174, the leading end portion of the next succeeding or second tube 24 will be engaged by the feed rollers 196 and 198 in the main feed stand. While the next succeeding or second tube is disposed in engagement with the trailing end 152 of the final end portion 146 of the first tube 24, the next succeeding or second tube will push the first tube onto the mandrel 50 to the position illustrated in FIG. 8.

The trough 182 (FIG. 1) has a bottom surface which is aligned with the mandrel 50. Therefore, the trough 182 functions to maintain the trailing end 152 (FIG. 8) of the final end portion 146 of the first tube 25 and the leading end of the next succeeding or second tube 24 in axial alignment with each other and with the mandrel 50.

It is believed that in many situations the final end portion 146 (FIG. 8) of the first tube 24 will be so short as to be unable to span the distance between the main feed stand 174 (FIG. 1) and the right end of the mandrel 50. In these situations, the short final end portion 146 of the first tube is supported by the trough 182. The trough 182 positions the short final end portion 146 of the first tube 24 in axial alignment with the mandrel 50 and the leading end of the next succeeding or second tube 24. Therefore, the next succeeding or second tube 24 can push the relatively short final end portion 146 of the first tube 24 from the trough 182 onto the mandrel 50.

Tube Cutter Assembly

Figure 13:
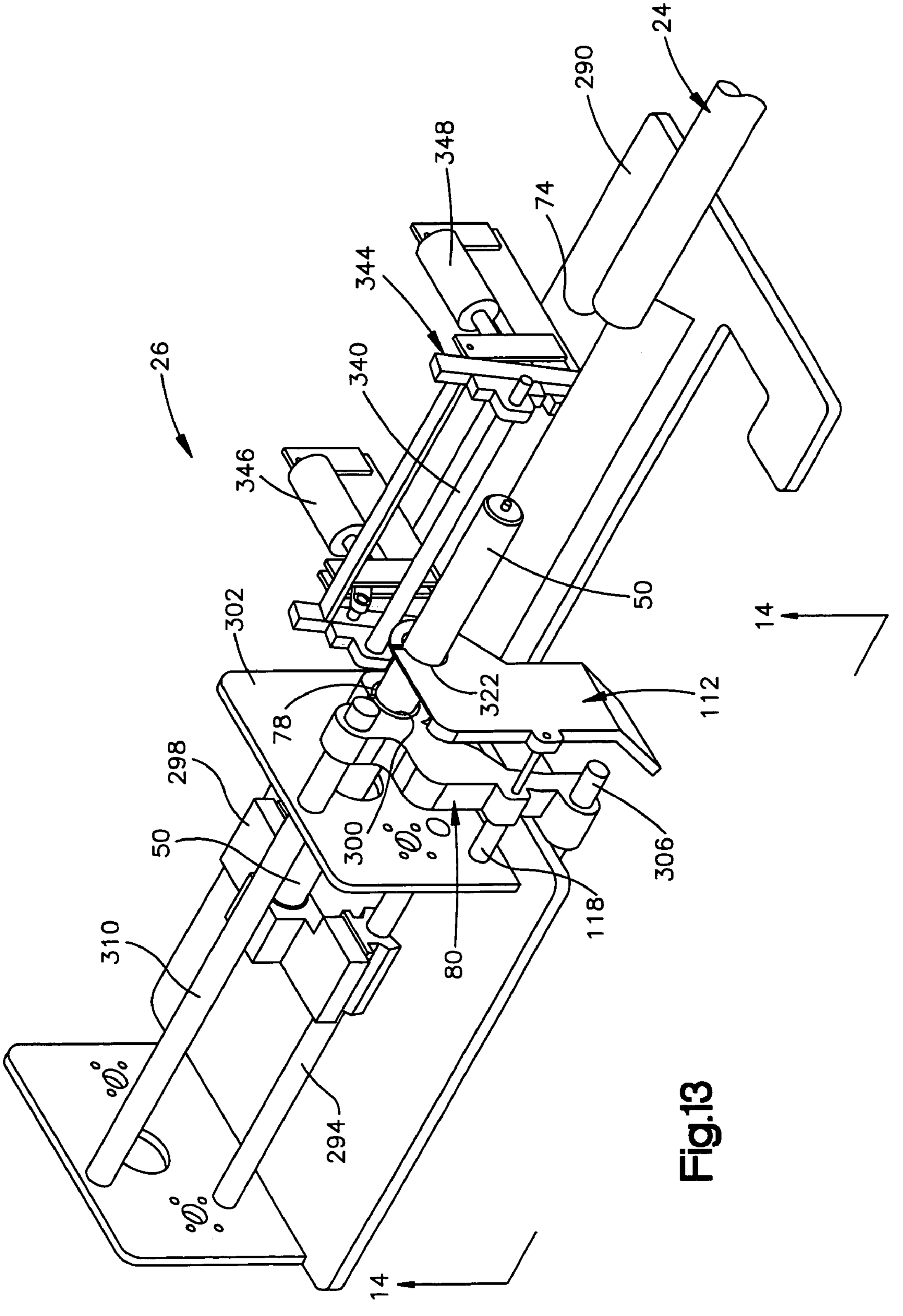
FIG. 13 is a simplified schematic pictorial illustration of a tube cutter assembly utilized in the apparatus of FIG. 1.
Figure 14:
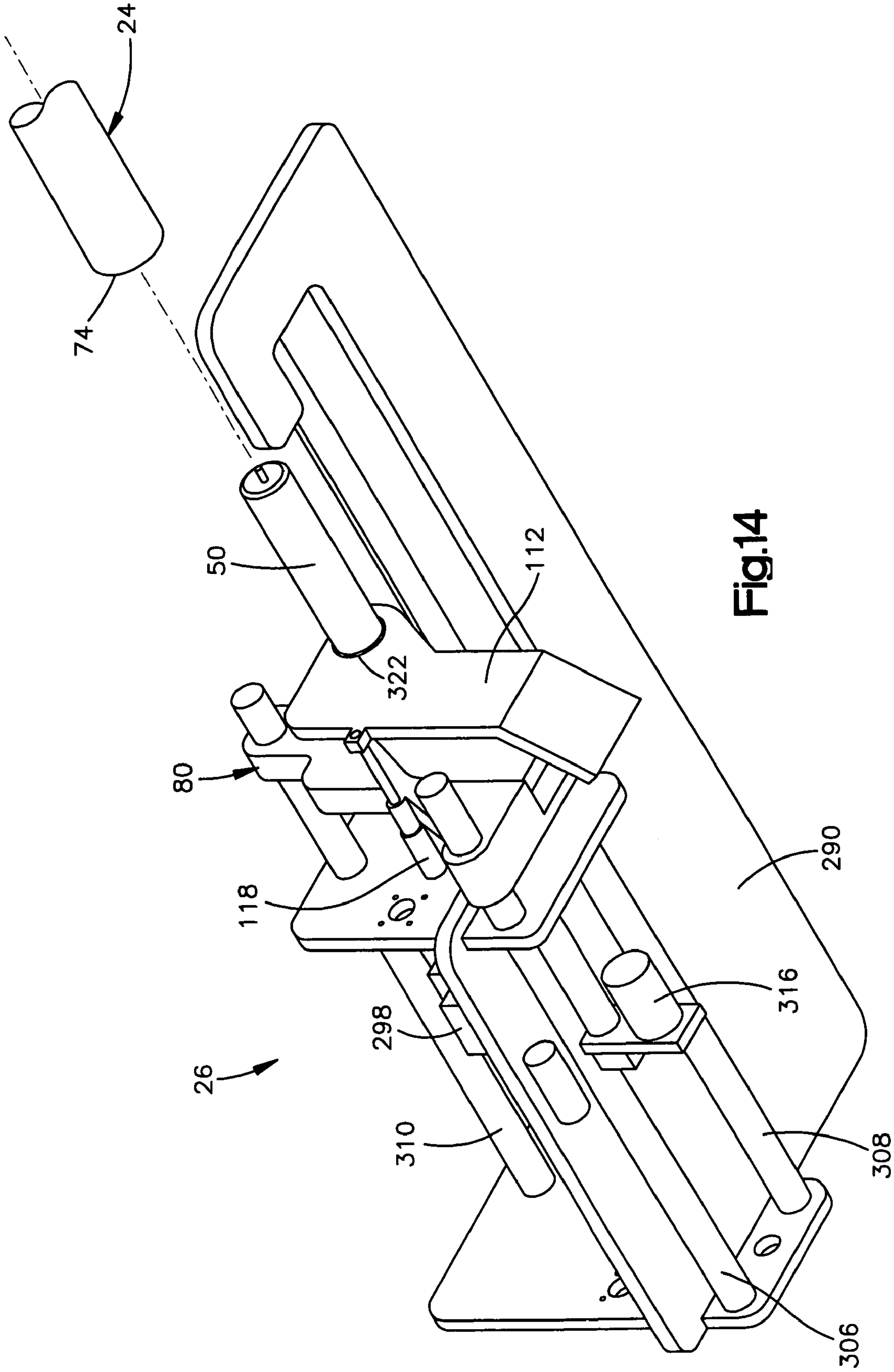
FIG. 14 is a simplified schematic bottom view, taken generally along the line of 14-14 of FIG. 13, further illustrating the construction of the tube cutter assembly.
Figure 15:
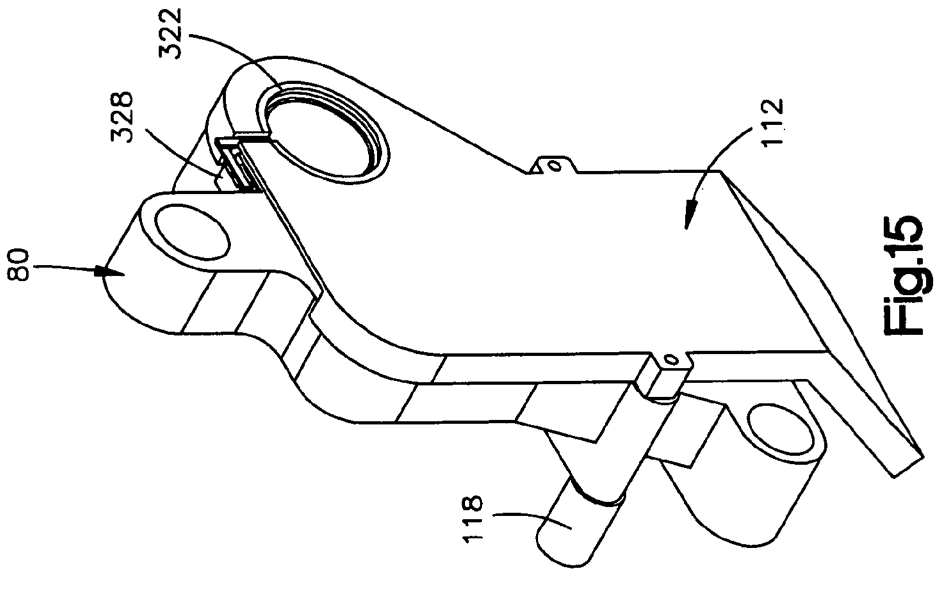
FIG. 15 is a schematic pictorial illustration depicting the relationship between the stripper plate and the baffle when the baffle is retracted against the stripper plate.

FIGS. 13 and 14 are schematic illustrations of the tube cutter assembly 26. The tube cutter assembly 26 includes a base 290. The mandrel 50 is movable relative to the base 290 and a pair of parallel guide bars 294. Although only a single guide bar 294 is shown in FIG. 13, it should be understood that there are a pair of parallel guide bars. A slide block 298 extends between the guide bars 294. The left (as viewed in FIG. 13) end of the mandrel 50 is connected to the slide block 298. The motor 124 (FIG. 4) is connected with the slide block 298 (FIG. 13).

The mandrel 50 is extended and retracted by operation of the motor 124 (FIG. 4) and movement of the slide block 298 (FIG. 13) along the guide bars 294. In addition, the mandrel 50 extends through a cylindrical opening 300 (FIG. 17) in the baffle plate 80. Movement of the mandrel relative to the base 290 is guided by the mandrel guide bars 294 and by engagement of the mandrel with the surface which forms the opening 300 in the stripper plate 80. The mandrel 50 extends through an upright wall 302 connected with the base 90. It is contemplated that bearings could be provided on the wall 302 around the mandrel 50 to further guide and support the mandrel.

A plurality of back up rollers (not shown) may be provided to provide support for the mandrel 50 and tube 24 during cutting of the tube. The back up rollers have a cylindrical configuration and have central axes which extend parallel to the central axis of the mandrel 50. The back up rollers have cylindrical outer side surfaces which engage circumferentially spaced locations on the cylindrical outer side surface of the tube 24 during cutting of the tube. The back up rollers may be moved toward and away from the mandrel 50 in a known manner.

The stripper plate 80 is supported by a pair of parallel lower guide bars 306 and 308 (FIG. 14). In addition, movement of the stripper plate is guided by an upper guide bar 310 which extends parallel to the two lower guide bars 306 and 308. The stripper plate motor 104 (FIG. 1) is a linear actuator 316 (FIG. 14) which is connected with the stripper plate 80 and is effective to move the stripper plate 80 along the guide bars 306-310. It should be understood that control apparatus, similar to the control apparatus disclosed in the aforementioned U.S. Pat. No. 5,214,988 may be provided in association with the mandrel slide block 298 and with the stripper plate 80.

Figure 17:
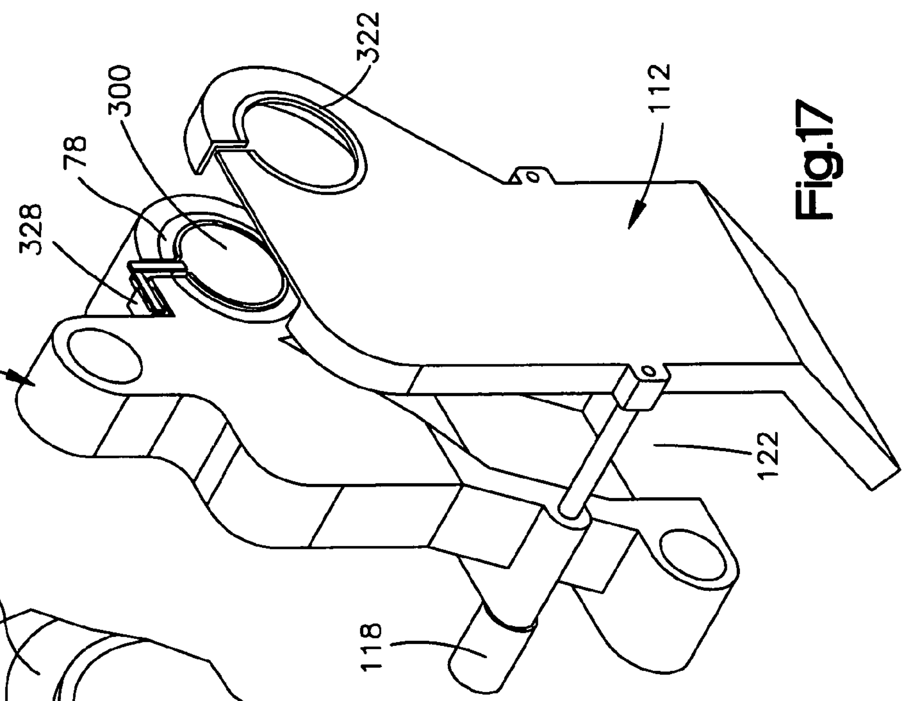
FIG. 17 is a schematic pictorial illustration, generally similar to FIG. 15, illustrating the relationship between the stripper plate and baffle when the baffle is in an extended position spaced from the stripper plate.

The baffle 112 is supported on the stripper plate 80 (FIGS. 13, 14, 15 and 17). The baffle 112 has a circular opening 322 through which the mandrel 50 extends (FIGS. 13, 14 and 17). The baffle opening 322 has a diameter which is slightly greater than the outside diameter of a tube 24 (FIG. 13). This enables the tube 24 to move through the opening 322 in the baffle 112 into engagement with the stop surface 78 on the stripper plate 80. The stop surface 78 extends around the opening 300 through which the mandrel 50 extends. Therefore, the tube 24 can telescopically move along the mandrel 50 through the opening 322 in the baffle 112 into engagement with the stop surface 78 on the stripper plate 80.

The knives 42 (FIG. 2) are disposed in a linear array on a spindle or arbor 340 (FIG. 13). Annular spacers may be provided on the arbor 340 (FIG. 13) in spaces 342 (FIG. 2) between the knives 42. The cylindrical spacers have an axial extent which is less than the axial extent of the product sections 86 by an amount which corresponds to the thickness of a knife 42. The arbor 340, spacers, and knives 42 are rotated together relative to the mandrel 50 by operation of the knife drive motor 46 (FIG. 1).

The arbor 340 (FIG. 13) is mounted on a frame 344. The frame 344 is pivotally connected to the base 290. Motors 346 and 348 are operable to pivot the frame 344 toward and away from the mandrel 50. Pivotal movement of the frame 344 by the motors 346 and 348 moves the knives 42 (FIG. 2) between their retracted positions (FIG. 3) and their extended positions (FIG. 4).

In addition to the components of the tube feed assembly 22, the controller 238 controls operation of components of the tube cutter assembly 26. Therefore, the baffle motor 118 (FIG. 3) is connected with the controller 238 (FIG. 10) by a lead 332 (FIG. 1). The cutter feed motors 346 and 348 (FIG. 13) are connected with the controller 238 (FIG. 1) by a lead 334. The mandrel drive motor 66 (FIG. 2) is connected with the controller 238 by a lead 336. The stripper plate drive motor 104 (FIG. 2) is connected with the controller 238 by a lead 338. The knife drive motor 46 is connected with the controller 238 by a lead 340. Other components of the tube cutter assembly 26 are connected with the controller 238 in a similar manner.

Figure 16:
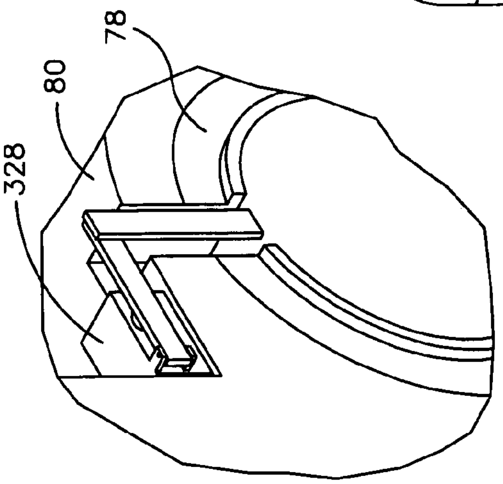
FIG. 16 is an enlarged fragmentary schematic illustration depicting the relationship of a limit switch to the stripper plate of FIG. 15.

As a leading end of a tube 24 (FIG. 13) moves toward the stop surface 78 (FIG. 16) on the stripper plate 80, the leading end of the tube actuates a limit switch 328 (FIG. 16). The limit switch 328 is connected with the controller 238. Actuation of the limit switch 328 is effective to inform the controller 328 that the end of the tube 24 is in engagement with the stop surface 78.

After the leading end portion 54 of the tube 24 has been cut in the manner illustrated schematically in FIG. 5, the stripper plate 80 is retracted by operation of the linear actuator 316. At the same time, the baffle motor 118 is operated to extend the baffle 112. This results in the formation of a space 122 between the stripper plate 80 and baffle 112 (FIGS. 5 and 17).

Conclusion

The present invention relates to a new and improved method and apparatus 20 for processing tubes 24. When a tube 24 is to be processed, a first portion 54 of the tube is moved into a work station 58. The first portion 54 of the tube is cut into a plurality of sections 86 and 88 at the work station 58.

One of the sections into which the first portion 54 of the tube is cut may be a scrap section 88 at one end of the tube. The scrap section 88 is moved to a scrap receiving location 32. Sections 86 of the tube other than the scrap section 88 may be moved to a product receiving location 34 which is separate from the scrap receiving location 32.

After the first portion 54 of the tube 24 has been cut into a plurality of sections 86 and 88 and the sections moved to receiving locations 32 and 34, a second portion 134 of the tube 24 is moved into the work station 58. The second portion 134 of the tube 24 is then cut into a plurality of sections. The plurality of sections of the second portion 134 of the tube may be moved to the product receiving location 34.

When a tube 24 is moved into the work station 58, the tube is moved along its longitudinal central axis. As the tube 24 is moved along its longitudinal central axis, the tube may be rotated about is longitudinal central axis. During movement of the tube 24 into the work station 58, the tube is aligned with and moves into a telescopic relationship with the mandrel 50.

When the first portion 54 of the tube 24 moves into the work station 58, an end 74 of the first portion of the tube may be pressed against a stop surface 78. After the first portion 54 of the tube 24 has been cut into a plurality of sections 86 and 88, the second portion 134 of the tube may be moved along its longitudinal central axis in a direction away from the first portion 54 of the tube. Cut sections 86 and 88 of the first portion 54 of the tube 24 may then be disengaged from the mandrel 50. As the second portion 134 of the tube 24 is subsequently moved into the work station 58, an end 136 of the second portion 134 of the tube 24 may move into engagement with the stop surface 78.

The present invention includes a plurality of different features which are described herein in association with each other. However, it is contemplated that each of the features may be utilized separately or may be combined in a different manner with other features of the invention. It is also contemplated that various features of the invention may be utilized separately or in combination with each other and/or in combination with features from the prior art. For example, the tube cutter assembly 26 may be used with a different tube feed assembly 22. As a further example, the tube feed assembly 22 may be used with a different tube cutter.

Having described the invention, the following is claimed:

1. A method of processing a tube, said method comprising the steps of:

rotating a mandrel disposed at a work station, moving a first portion of the tube into a the work station, said step of moving the first portion of the tube into the work station includes the steps of rotating the tube about its longitudinal central axis at the same speed as the mandrel while the tube is spaced apart from the mandrel and moving the mandrel and tube into a telescopic relationship while rotating the mandrel and tube at the same speed, cutting the first portion of the tube into a first plurality of sections while rotating the tube and mandrel, receiving a scrap section which is disposed on an end of the first portion of the tube at a scrap receiving location, receiving sections of the first portion of the tube other than the scrap section at a second receiving location which is separate from the scrap receiving location, moving a second portion of the tube into the work station while rotating the tube and mandrel at the same speed, cutting the second portion of the tube into a second plurality of sections, and directing the second plurality of sections to the second receiving location which is separate from the scrap receiving location.

2. A method as set forth in claim 1 wherein said step of cutting the first portion of the tube into a first plurality of sections includes forming an end surface on the second portion of the tube, said step of moving the second portion of the tube into the work station while rotating the tube and mandrel at the same speed is performed with the end surface on the second portion of the tube leading.

3. A method as set forth in claim 1 further including the step of pressing an end of the first portion of the tube against a stop surface under the influence of force transmitted from the second portion of the tube to the first portion of the tube during cutting of the first portion of the tube.

4. A method as set forth in claim 1 further including the steps of pressing an end surface on the first portion of the tube against a stop surface while rotating the tube and mandrel at the same speed with the stop surface in a first position during cutting of the first portion of the tube into a first plurality of sections, moving the stop surface to a position spaced from the first position, said step of cutting the second portion of the tube includes pressing an end surface on the second portion of the tube against the stop surface with while rotating the tube and mandrel at the same speed the stop surface in a position spaced from the first position.

5. A method as set forth in claim 1 further including the step of moving the second portion of the tube in a direction away from the work station after performing said step of cutting the first portion of the tube and prior to performance of said step of moving the second portion of the tube into the work station, said step of moving the second portion of the tube away from the work station being performed while rotating the mandrel and second portion of the tube.

6. A method as set forth in claim 1 further including the step rotating the tube at the same speed as the mandrel while the tube and mandrel are in a telescopic relationship, said step of rotating the tube at the same speed as the mandrel includes applying force to the tube at a location spaced from the mandrel.

7. A method as set forth in claim 1 wherein said step of moving a first portion of the tube into the work station includes moving the tube along a longitudinal central axis of the tube, reducing the speed of movement of the tube along its longitudinal central axis, and engaging a stop surface with a leading end of the tube after reducing the speed of movement of the tube.

8. A method as set forth in claim 7 further including the step of pressing the leading end of the tube against the stop surface during cutting of the first portion of the tube into a first plurality of sections.

9. A method as set forth in claim 1 further including the step of rotating the first and a second portions of the tube about a longitudinal central axis of the tube during cutting of the first portion of the tube.

10. A method as set forth in claim 1 wherein said step of moving the first portion of the tube into the work station includes operating a feed assembly to move the tube along its longitudinal central axis.

11. A method as set forth in claim 10 wherein said step of moving the first portion of the tube into the work station includes rotating the tube about its longitudinal central axis under the influence of force transmitted from the feed assembly to the tube.

12. A method as set forth in claim 1 wherein said step of moving the first portion of the tube into the work station includes engaging the tube with a plurality of feed rollers and rotating the feed rollers to move the tube along a longitudinal central axis of the tube under the influence of force applied to the tube by the feed rollers.

13. A method as set forth in claim 12 wherein said step of rotating the feed rollers to move the tube along the longitudinal central axis of the tube includes rotating at least one of the feed rollers about an axis which is skewed relative to the longitudinal central axis of the tube.

14. A method as set forth in claim 12 wherein said step rotating the feed rollers to move the tube along the longitudinal central axis of the tube includes rotating a first feed roller about a first axis which is skewed relative to the longitudinal central axis of the tube and rotating a second feed roller about a second axis which is skewed relative to the longitudinal central axis of the tube.

15. A method as defined in claim 1 wherein said moving, cutting and directing steps are repeated until said tube is spent.

16. A method as set forth in claim 1 wherein said step of moving a first portion of the tube into the work station includes moving a leading end of the tube into the work station at a first speed, reducing the speed at which the leading end of the tube moves into the work station to a second speed which is less than the first speed, and moving the leading end of the tube into engagement with a stop while the leading end of the tube is moving at the second speed.

17. A method as set forth in claim 1 wherein said step moving a first portion of the tube into the work station includes engaging the tube with a plurality of sets of rollers and rotating the rollers in each set of rollers about axes which are skewed relative to each other and are skewed relative to a longitudinal central axis of the tube.

18. A method as set forth in claim 1 wherein said step of moving a first portion of the tube into a work station includes moving the tube in a first direction along its longitudinal central axis to move the first portion of the tube and a mandrel into a telescopic relationship at the work station, and pressing an end of the first portion of the tube against a stop surface at the work station, said method further includes the steps of moving the second portion of the tube along its longitudinal central axis in a direction opposite to the first direction to move the second portion of the tube away from the first portion of the tube after performing said step of cutting the first portion of the tube, withdrawing the mandrel from the plurality of sections formed by cutting the first portion of the tube, said step of moving the second portion of the tube into the work station includes moving the second portion of the tube along its longitudinal central axis to move the second portion of the tube and the mandrel into a telescopic relationship at the work station, and pressing the end of the second portion of the tube against the stop surface at the work station.

19. A method as set forth in claim 18 wherein said step of moving the first portion of the tube and the mandrel into a telescopic relationship includes simultaneously moving the tube in the first direction along its longitudinal central axis and moving the mandrel along the longitudinal central axis of the tube in the direction opposite to the first direction.

20. A method as set forth in claim 1 wherein said step of cutting the first portion of the tube into a first plurality of sections includes pressing an end of the first portion of the tube against the stop surface while the stop surface is in a first position, said method further includes moving the stop surface to a second position, said step of culling the second portion of the tube includes pressing an end of the second portion of the tube against the stop surface with the stop surface in the second position.

21. A method of processing a tube, said method comprising the steps of:

rotating a mandrel disposed at a work station, rotating the tube, moving a first portion of the tube into the work station while rotating the tube and mandrel, said step of moving the first portion of the tube into the work station includes moving a leading end of the tube into the work station at a first speed while rotating the tube, reducing the speed at which the leading end of the tube moves into the work station to a second speed which is less than the first speed while rotating the tube, and moving the leading end of the tube into engagement with a stop while the leading end of the tube is moving at the second speed and while rotating the tube, cutting the first portion of the tube into a first plurality of sections while rotating the tube and mandrel, receiving a scrap section which is disposed on an end of the first portion of the tube at a scrap receiving location, receiving sections of the first portion of the tube other than the scrap section at a second receiving location which is separate from the scrap receiving location, moving a second portion of the tube into the work station while rotating the tube and mandrel, cutting the second portion of the tube into a second plurality of sections, directing the second plurality of sections to the second receiving location which is separate from the scrap receiving location.

22. A method as set forth in claim 21 wherein said step of cutting the first portion of the tube into a first plurality of sections includes forming an end surface on the second portion of the tube, said step of moving the second portion of the tube into the work station is performed with the end surface on the second portion of the tube leading.

23. A method as set forth in claim 21 further including the step of pressing an end of the first portion of the tube against the stop under the influence of force transmitted from the second portion of the tube to the first portion of the tube during cutting of the first portion of the tube, said stop of pressing the first end portion of the tube against the stop being performed while rotating the tube relative to the stop.

24. A method as set forth in claim 21 further including the steps of pressing the end of the first portion of the tube against the stop with the stop surface in a first position during cutting of the first portion of the tube into a first plurality of sections, moving the stop surface to a position spaced from the first position, said step of cutting the second portion of the tube includes pressing an end of the second portion of the tube against the stop with the stop in a position spaced from the first position.

25. A method as set forth in claim 21 wherein said step of moving the first portion of the tube into the work station includes moving the first portion of the tube along a longitudinal central axis of the tube, said step of moving a second portion of the tube into the work station includes moving the second portion of the tube along the longitudinal central axis of the tube.

26. A method as set forth in claim 21 further including the step of moving the second portion of the tube in a direction away from the work station after performing said step of cutting the first portion of the tube and prior to performance of said step of moving the second portion of the tube into the work station.

27. A method as set forth in claim 21 further including the step of moving the first end portion of the tube and a mandrel into a telescopic relationship in which the mandrel is disposed inside the first portion of the tube, rotating the mandrel while the tube and mandrel are in a telescopic relationship, and rotating the tube at the same speed as the mandrel while the tube and mandrel are in a telescopic relationship, said step of rotating the tube at the same speed as the mandrel includes rotating the tube under the influence of force applied to the tube at a location spaced from the mandrel.

28. A method as set forth in claim 21 further including the step of pressing the leading end of the tube against the stop during cutting of the first portion of the tube into a first plurality of sections.

29. A method as set forth in claim 21 wherein said step of moving the first portion of the tube into the work station includes engaging the tube with a plurality of feed rollers and rotating the feed rollers to move the tube along a longitudinal central axis of the tube and to rotate the tube about its longitudinal central axis under the influence of force applied to the tube by the feed rollers.

30. A method as set forth in claim 29 wherein said step of rotating the feed rollers to move the tube along the longitudinal central axis of the tube includes rotating at least one of the feed rollers about an axis which is skewed relative to the longitudinal central axis of the tube.

31. A method as set forth in claim 29 wherein said step rotating the feed rollers to move the tube along the longitudinal central axis of the tube and to rotate the tube about its longitudinal central axis includes rotating a first feed roller about a first axis which is skewed relative to the longitudinal central axis of the tube and rotating a second feed roller about a second axis which is skewed relative to the longitudinal central axis of the tube.

32. A method of processing a tube, said method comprising the steps of:

rotating a mandrel, rotating the tube, moving a first portion of the tube into a work station, said step of moving the first portion of the tube into the work station includes the steps of rotating the tube about its longitudinal central axis at the same speed as the mandrel while the tube is spaced apart from the mandrel and moving the mandrel and tube into a telescopic relationship while rotating the mandrel and tube at the same speed, reducing the speed at which a leading end of the tube moves into the work station from a first speed to a second speed which is less than the first speed while the mandrel and tube are in the telescopic relationship, and moving the leading end of the tube into engagement with a stop while the leading end of the tube is moving at the second speed and the mandrel and tube are in the telescopic relationship, cutting the first portion of the tube into a first plurality of sections while rotating the tube and mandrel, receiving a scrap section which is disposed on an end of the first portion of the tube at a scrap receiving location, receiving sections of the first portion of the tube other than the scrap section at a second receiving location which is separate from the scrap receiving location, moving a second portion of the tube into the work station while rotating the tube and mandrel, cutting the second portion of the tube into a second plurality of sections, and directing the second plurality of sections to the second receiving location which is separate from the scrap receiving location.

33. A method as set forth in claim 32 wherein said step moving a first portion of the tube into the work station includes engaging the tube with a plurality of sets of rollers and rotating the rollers in each set of rollers about axes which are skewed relative to each other and are skewed relative to a longitudinal central axis of the tube.

34. A method as set forth in claim 32 wherein said step of moving a first portion of the tube into the work station includes engaging the tube with a plurality of feed rollers and rotating the feed rollers to move the tube along a longitudinal central axis of the tube under the influence of force applied to the tube by the feed rollers.

35. A method as set forth in claim 34 wherein said step of rotating the feed rollers to move the tube along the longitudinal central axis of the tube includes rotating at least one of the feed rollers about an axis which is skewed relative to the longitudinal central axis of the tube.

36. A method as set forth in claim 34 wherein said step of rotating the feed rollers to move the tube along the longitudinal central axis of the tube includes rotating a first feed roller about a first axis which is skewed relative to the longitudinal central axis of the tube and rotating a second feed roller about a second axis which is skewed relative to the first axis.

37. A method as set forth in claim 32 wherein said step of moving a first portion of the tube into a work station includes moving the tube in a first direction along its longitudinal central axis to move the first portion of the tube and a mandrel into a telescopic relationship at the work station, said method further includes the steps of moving the second portion of the tube along its longitudinal central axis in a direction opposite to the first direction to move the second portion of the tube away from the first portion of the tube after performing said step of cutting the first portion of the tube, withdrawing the mandrel from the plurality of sections formed by cutting the first portion of the tube, said step of moving the second portion of the tube into the work station includes moving the second portion of the tube along its longitudinal central axis to move the second portion of the tube and the mandrel into a telescopic relationship at the work station, and pressing the end of the second portion of the tube against the stop at the work station.

38. A method as set forth in claim 37 wherein said step of moving the tube and the mandrel into a telescopic relationship includes simultaneously moving the tube in the first direction along its longitudinal central axis and moving the mandrel along the longitudinal central axis of the tube in the direction opposite to the first direction.

39. A method as set forth in claim 32 wherein said step of cutting the first portion of the tube into a first plurality of sections includes pressing an end of the first portion of the tube against the stop while the stop is in a first position, said method further includes moving the stop to a second position, said step of cutting the second portion of the tube includes pressing an end of the second portion of the tube against the stop with the stop in the second position.

* * * * *

UNITED STATES PATENT AND TRADEMARK OFFICE

CERTIFICATE OF CORRECTION

PATENT NO. : 7,398,716 B2 
APPLICATION NO. : 10/780456
DATED : July 15, 2008
INVENTOR(S) : John Quigley It is certified that error appears in the above-identified patent and that said Letters Patent is hereby corrected as shown below:

Column 25, line 40, after “step of” delete “culling” and insert --cutting--

Signed and Sealed this

Eleventh Day of November, 2008

JON W. DUDAS
*Director of the United States Patent and Trademark Office*